United States Patent
Kito et al.

(10) Patent No.: US 11,945,152 B2
(45) Date of Patent: Apr. 2, 2024

(54) MODEL MATERIAL INK SET, SUPPORT MATERIAL COMPOSITION, INK SET, THREE-DIMENSIONAL SHAPED OBJECT, AND METHOD FOR MANUFACTURING THREE-DIMENSIONAL SHAPED OBJECT

(71) Applicants: MAXELL, LTD., Kyoto (JP); MIMAKI ENGINEERING CO., LTD., Nagano (JP)

(72) Inventors: Katsuyuki Kito, Kyoto (JP); Taeko Izumo, Kyoto (JP); Masakatsu Okawa, Nagano (JP); Kenta Hongo, Nagano (JP)

(73) Assignees: MAXELL, LTD., Kyoto (JP); MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/491,477

(22) PCT Filed: Mar. 2, 2018

(86) PCT No.: PCT/JP2018/008134
§ 371 (c)(1),
(2) Date: Sep. 5, 2019

(87) PCT Pub. No.: WO2018/164012
PCT Pub. Date: Sep. 13, 2018

(65) Prior Publication Data
US 2020/0023572 A1    Jan. 23, 2020

(30) Foreign Application Priority Data
Mar. 6, 2017    (JP) .................................. 2017-042135

(51) Int. Cl.
*B33Y 70/00*    (2020.01)
*B29C 64/112*    (2017.01)
(Continued)

(52) U.S. Cl.
CPC ............ *B29C 64/112* (2017.08); *B29C 64/40* (2017.08); *B33Y 70/00* (2014.12); *C08F 2/50* (2013.01);
(Continued)

(58) Field of Classification Search
CPC ........ B29C 64/00; B29C 64/112; B33Y 70/00
See application file for complete search history.

(56) References Cited

U.S. PATENT DOCUMENTS 5,476,748 A * 12/1995 Steinmann ............ C08F 283/00
                                                   430/269
6,099,787 A *  8/2000 Melisaris ................. C08K 5/17
                                                   264/401
(Continued)

FOREIGN PATENT DOCUMENTS

CN        102725689 A    10/2012
CN        102876132 A     1/2013
(Continued)

OTHER PUBLICATIONS

Translation of the International Preliminary Report on Patentability and the Written Opinion of the International Searching Authority issued in corresponding International Patent Application No. PCT/JP2018/008134, dated Sep. 19, 2019.
(Continued)

*Primary Examiner* — Andrew D Graham
(74) *Attorney, Agent, or Firm* — Rimon P.C.

(57) ABSTRACT

The present invention relates to a model material ink set for use in an optical molding method by an inkjet system, wherein the ink set comprises a color ink and a clear ink containing an ethylenically unsaturated monomer, as a model material ink, wherein the color ink contains, as the ethylenically unsaturated monomer, 30 to 75% of a (meth)acrylate and 10 to 50% of an ethylenically unsaturated
(Continued)

monomer that is not a (meth)acrylate and that contains a nitrogen atom, based on a total amount of the color ink, the clear ink contains, as the ethylenically unsaturated monomer, 30 to 80% of a (meth)acrylate based on a total amount of the clear ink, provided that a content of the ethylenically unsaturated monomer that is not a (meth)acrylate and that contains a nitrogen atom is less than 10% based on the total amount of the clear ink.

26 Claims, 1 Drawing Sheet

(51) Int. Cl.
| | | |
|---|---|---|
| *B29C 64/40* | (2017.01) | |
| *C08F 2/50* | (2006.01) | |
| *C08F 290/06* | (2006.01) | |
| *C08L 75/06* | (2006.01) | |
| *B33Y 10/00* | (2015.01) | |
| *B33Y 80/00* | (2015.01) | |

(52) U.S. Cl.
CPC ............ *C08F 290/06* (2013.01); *C08L 75/06* (2013.01); *B33Y 10/00* (2014.12); *B33Y 80/00* (2014.12)

(56) References Cited

U.S. PATENT DOCUMENTS

| | | | | | |
|---|---|---|---|---|---|
| 6,100,007 | A * | 8/2000 | Pang | ........................ | G03F 7/038 |
| | | | | | 430/269 |
| 8,104,884 | B2 * | 1/2012 | Tabayashi | ................ | C09D 7/62 |
| | | | | | 347/102 |
| 2001/0046642 | A1 * | 11/2001 | Johnson | ................ | B29C 64/106 |
| | | | | | 430/280.1 |
| 2003/0059708 | A1 * | 3/2003 | Yamamura | .............. | G03F 7/038 |
| | | | | | 430/269 |
| 2004/0077745 | A1 * | 4/2004 | Xu | ........................ | C09D 151/08 |
| | | | | | 522/170 |
| 2004/0142274 | A1 * | 7/2004 | Thies | ........................ | G03F 7/038 |
| | | | | | 430/269 |
| 2005/0072519 | A1 * | 4/2005 | Johnson | ................... | C09D 4/00 |
| | | | | | 156/275.5 |
| 2005/0101684 | A1 * | 5/2005 | You | ........................ | B29C 64/153 |
| | | | | | 522/1 |
| 2006/0235101 | A1 * | 10/2006 | Messe | ................... | G03F 7/0037 |
| | | | | | 522/81 |
| 2007/0205528 | A1 * | 9/2007 | Patel | ..................... | G03F 7/0037 |
| | | | | | 264/16 |
| 2008/0076846 | A1 * | 3/2008 | Kito | ..................... | C09D 11/101 |
| | | | | | 522/26 |
| 2008/0103226 | A1 * | 5/2008 | Xu | .......................... | G03F 7/038 |
| | | | | | 522/130 |
| 2008/0182078 | A1 * | 7/2008 | Johnson | ................ | B29C 64/106 |
| | | | | | 428/195.1 |
| 2009/0197988 | A1 * | 8/2009 | Kito | ..................... | C09D 11/101 |
| | | | | | 522/26 |
| 2010/0015408 | A1 * | 1/2010 | Fong | ..................... | G03F 7/0037 |
| | | | | | 428/195.1 |
| 2011/0015294 | A1 * | 1/2011 | Kito | ..................... | C09D 11/101 |
| | | | | | 522/26 |
| 2011/0028586 | A1 * | 2/2011 | Kito | ..................... | C09D 11/101 |
| | | | | | 522/63 |
| 2011/0230582 | A1 * | 9/2011 | Kito | ..................... | C09D 11/101 |
| | | | | | 522/39 |
| 2011/0293891 | A1 * | 12/2011 | Leyden | ................... | G03F 7/038 |
| | | | | | 428/172 |
| 2013/0004744 | A1 * | 1/2013 | Kito | ..................... | B41M 7/0045 |
| | | | | | 522/18 |
| 2013/0234370 | A1 * | 9/2013 | Suzuki | ................... | B29C 64/40 |
| | | | | | 522/79 |
| 2013/0267627 | A1 * | 10/2013 | Kito | ........................ | C09D 11/54 |
| | | | | | 522/168 |
| 2015/0125702 | A1 * | 5/2015 | He | ........................... | C08F 2/50 |
| | | | | | 428/413 |
| 2016/0001505 | A1 | 1/2016 | Hakkaku et al. | | |
| 2016/0145452 | A1 | 5/2016 | Fong et al. | | |
| 2016/0263826 | A1 | 9/2016 | Suzuki et al. | | |
| 2016/0264796 | A1 | 9/2016 | Suzuki et al. | | |
| 2017/0001382 | A1 | 1/2017 | Stepper et al. | | |
| 2017/0008228 | A1 | 1/2017 | Iwata et al. | | |
| 2018/0079923 | A1 | 3/2018 | Umebayashi | | |
| 2018/0265720 | A1 * | 9/2018 | Kitou | .................. | C09D 11/101 |
| 2019/0009453 | A1 * | 1/2019 | Kitou | ................... | B29C 64/268 |
| 2020/0023572 | A1 * | 1/2020 | Kito | ........................ | B29C 64/40 |

FOREIGN PATENT DOCUMENTS

| | | |
|---|---|---|
| CN | 105058791 A | 11/2015 |
| EP | 2 568 018 A2 | 3/2013 |
| EP | 3305508 A1 | 4/2018 |
| EP | 3330306 A1 | 6/2018 |
| JP | 2007-516318 A | 6/2007 |
| JP | 2010-155926 A | 7/2010 |
| JP | 2012-111226 A | 6/2012 |
| JP | 2013-067770 A | 4/2013 |
| JP | 2015-183103 A | 10/2015 |
| JP | 2016-026915 A | 2/2016 |
| JP | 2016-112824 A | 6/2016 |
| JP | 2017-001226 A | 1/2017 |
| JP | 2017-024259 A | 2/2017 |
| JP | 2017-031249 A | 2/2017 |
| WO | 2005/045523 A1 | 5/2005 |
| WO | 2011/091228 A1 | 7/2011 |
| WO | 2015/144761 A1 | 10/2015 |
| WO | 2016/199611 A1 | 12/2016 |

OTHER PUBLICATIONS

International Search Report issued in corresponding International Patent Application No. PCT/JP2018/008134, dated Apr. 3, 2018, with English translation.
Written Opinion of the International Searching Authority issued in corresponding International Patent Application No. PCT/JP2018/008134, dated Mar. 19, 2018, with English translation.
Extended European Search Report issued in corresponding European Patent Application No. 18763618.8-1107, dated Nov. 17, 2020.
Chinese Office Action issued in corresponding Chinese Patent Application No. 201880007905.8, dated Dec. 17, 2020, with English translation.
Communication pursuant to Article 94(3) EPC issued in related EP Application No. 18763618.8, dated Sep. 24, 2021.
Notice of Reasons for Refusal issued in corresponding Japanese Patent Application No. 2019-504549, dated Jan. 18, 2022 w/Machine English Translation.

* cited by examiner

MODEL MATERIAL INK SET, SUPPORT MATERIAL COMPOSITION, INK SET, THREE-DIMENSIONAL SHAPED OBJECT, AND METHOD FOR MANUFACTURING THREE-DIMENSIONAL SHAPED OBJECT

CROSS REFERENCE

This application is the U.S. National Phase under 35 U.S.C. § 371 of International Application No. PCT/JP2018/008134, filed on Mar. 2, 2018, which claims the benefits of Japanese Application No. 2017-042135, filed on Mar. 6, 2017, the entire contents of which are hereby incorporated by reference.

TECHNICAL FIELD

The present patent application claims Paris Convention priority based on Japanese Patent Application No. 2017-042135 (filed Mar. 6, 2017), which is incorporated herein by reference in its entirety.

The present invention relates to a model material ink set, a support material composition and an ink set for use in an optical molding method by an inkjet system, as well as a three-dimensional shaped object constituted of a photocured product of a model material ink comprised in the model material ink set, and a method for manufacturing a three-dimensional shaped object.

BACKGROUND ART

Heretofore, as a method for fabricating a three-dimensional shaped object, a molding method using a photocurable resin composition which is cured by being irradiated with ultraviolet rays and the like has been widely known. Specifically, in such a molding method, a photocurable resin composition is irradiated with ultraviolet rays and the like, and thus cured to form a cured layer having a predetermined shape. Thereafter, a photocurable resin composition is further supplied onto the cured layer and cured to form a new cured layer. The above-mentioned steps are repeatedly performed to fabricate a three-dimensional shaped object.

Among the above-described molding methods, there has recently been reported an optical molding method by an inkjet system (hereinafter, referred to as an inkjet optical molding method) in which a photocurable resin composition is ejected from a nozzle, irradiated with ultraviolet rays and the like immediately thereafter, and thus cured to form a cured layer having a predetermined shape. The inkjet optical molding method does not require the installation of a large resin liquid tank for storing a photocurable resin composition and a darkroom. For this reason, the molding apparatus can be miniaturized as compared with that in the conventional methods. The inkjet optical molding method has attracted attentions as a molding method to be realized by a 3D printer which can freely fabricate a three-dimensional shaped object based on CAD (Computer Aided Design) data.

From the viewpoint of improving the dischargeability of a photocurable resin composition in a inkjet system, for example, Patent Document 1 describes a photocurable liquid resin composition that is considered to be suitable for an optical molding method by an inkjet system and that contains specific components (A) to (D) but does not contain specific components (E) and (F) equal to or more than prescribed amounts. In addition, when an optically molded object is manufactured by an inkjet system, a model material and a support material are usually used in combination, but it is necessary to improve the removability of the support material. Patent Document 2 describes a model material containing a curable resin component that is used in combination with a specific support material and that has a specific weighted average value of SP values within a specific range.

PRIOR ART DOCUMENT

Patent Documents

Patent Document 1: JP-A-2010-155926
Patent Document 2: JP-A-2012-111226

SUMMARY OF THE INVENTION

Problems to be Solved by the Invention

Conventionally, various proposals have been made in an optical molding method by an inkjet system, but there is still a demand for improvement in the appearance quality of a molded object as a photocured product of an ink and improvement in the strength thereof. The present inventors have investigated inks in order to provide a molded object superior in appearance quality and strength. As a result, with respect to a molded object as a photocured product of an ink. The present inventors have paid attention to the fact that the surface roughness affects the appearance quality of the molded object, especially, the texture of the surface, and have found that the appearance quality can be improved when a clear ink is used together with a color ink. In this case, although the problem regarding particularly the appearance quality to improve the texture of the surface can be solved, it has been found that there is a problem that a color change of a molded object tends to be noticeable during photocuring and with a lapse of time because the clear ink is high in transparency. In addition, in the case of using both a color ink and a clear ink, it has been difficult to prevent a color change of a molded object during photocuring and with a lapse of time while sufficiently enhancing the strength of the molded object. Therefore, it is an object of the present invention to provide an ink set capable of sufficiently enhancing the strength of a molded object as a photocured product of a color ink and a clear ink and preventing the color change of the molded object.

Solutions to the Problems

In order to solve the above-described problems, the present inventors have diligently studied the composition of a model material ink for use in an optical molding method by an inkjet system. As a result, the present inventors have found that by use of a model material ink set containing a color ink and a clear ink each having specific composition as a model material ink, the strength of a molded object as a photocured product of the color ink and the clear ink can be enhanced sufficiently and a color change of the molded object can be prevented. Accordingly, the present invention has been completed.

That is, the present invention includes the following preferred embodiments.

[1] A model material ink set for use in an optical molding method by an inkjet system, the ink set comprising a color ink and a clear ink as a model material ink, wherein the color ink and the clear ink each contain an ethylenically unsaturated monomer, the color ink contains, as the ethylenically unsaturated monomer, 30 to 75% by mass of a (meth)acrylate and 10 to 50% by mass of an ethylenically unsaturated monomer that is not a (meth)acrylate and that contains a nitrogen atom, based on a total amount of the color ink, the clear ink contains, as the ethylenically unsaturated monomer, 30 to 80% by mass of a (meth)acrylate based on a total amount of the clear ink, provided that a content of the ethylenically unsaturated monomer that is not a (meth) acrylate and that contains a nitrogen atom in the clear ink is less than 10% by mass based on the total amount of the clear ink.

[2] The model material ink set according to the above [1], wherein the ethylenically unsaturated monomer that is not a (meth)acrylate and that contains a nitrogen atom is selected from the group consisting of (meth)acrylamides and N-vinyllactams.

[3] The model material ink set according to the above [1] or [2], wherein the color ink and the clear ink each contain, as the ethylenically unsaturated monomer, a monofunctional ethylenically unsaturated monomer and a di- or more functional ethylenically unsaturated monomer.

[4] The model material ink set according to the above [3], wherein a content of the monofunctional ethylenically unsaturated monomer in the color ink is 30 to 70% by mass based on the total amount of the color ink.

[5] The model material ink set according to the above [3] or [4], wherein a content of the di- or more functional ethylenically unsaturated monomer in the color ink is 5 to 50% by mass based on the total amount of the color ink.

[6] The model material ink set according to any one of the above [3] to [5], wherein a content of the monofunctional ethylenically unsaturated monomer in the clear ink is 20 to 70% by mass based on the total amount of the clear ink.

[7] The model material ink set according to any one of the above [3] to [6], wherein a content of the di- or more functional ethylenically unsaturated monomer in the clear ink is 5 to 50% by mass based on the total amount of the clear ink.

[8] The model material ink set according to any one of the above [1] to [7], wherein the color ink and the clear ink each contain, as the (meth)acrylate, a (meth)acrylate having an alicyclic group and/or an aromatic hydrocarbon group.

[9] The model material ink set according to any one of the above [1] to [8], wherein the clear ink contains, as the (meth)acrylate, phenoxyethyl acrylate and/or ethoxylated phenyl acrylate.

[10] The model material ink set according to any one of the above [1] to [9], wherein the color ink contains, as the ethylenically unsaturated monomer that is not a (meth) acrylate and that contains a nitrogen atom, acryloylmorpholine and/or hydroxyethylacrylamide.

[11] The model material ink set according to any one of the above [1] to [10], wherein the color ink and the clear ink each further contain a polymerizable oligomer.

[12] The model material ink set according to the above [11], wherein the polymerizable oligomer has a urethane group.

[13] The model material ink set according to the above [11] or [12], wherein a content of the polymerizable oligomer in each of the color ink and the clear ink is 10 to 45% by mass based on a total amount of each ink.

[14] The model material ink set according to any one of the above [1] to [13], wherein the color ink and the clear ink each further contain 2 to 15% by mass of a photopolymerization initiator based on the total amount of each ink.

[15] The model material ink set according to any one of the above [1] to [14], wherein the color ink and the clear ink further contain a surface adjusting agent.

[16] The model material ink set according to any one of the above [1] to [15], wherein constitution of the color ink contains cyan, magenta and yellow.

[17] The model material ink set according to the above [16], wherein the constitution of the color ink further contains white and/or black.

[18] The model material ink set according to the above [16] or [17], wherein the cyan contains at least one pigment selected from the group consisting of C.I. Pigment Blue 15:3 and C.I. Pigment Blue 15:4, the magenta contains at least one pigment selected from the group consisting of C.I. Pigment Red 122, C.I. Pigment Red 202 and C.I. Pigment Violet 19, the yellow contains at least one pigment selected from the group consisting of C.I. Pigment Yellow 150 and C.I. Pigment Yellow 155, the white contains titanium oxide, and/or the black contains carbon black.

[19] The model material ink set according to the above [18], wherein the titanium oxide is rutile type titanium oxide.

[20] A support material composition for use with the model material ink set according to any one of the above [1] to [19], the support material composition comprising:

a monofunctional ethylenically unsaturated monomers; and a polyalkylene glycol having an oxyethylene group and/or an oxypropylene group.

[21] The support material composition according to the above [20], comprising:

20 to 50% by mass of the monofunctional ethylenically unsaturated monomers; and 20 to 50% by mass of the polyalkylene glycol having an oxyethylene group and/or an oxypropylene group, based on a total amount of the support material composition.

[22] The support material composition according to the above [20] or [21], further comprising 2 to 20% by mass of a photopolymerization initiator based on the total amount of the support material composition.

[23] The support material composition according to any one of the above [20] to [22], further comprising 3 to 35% by mass of a water-soluble organic solvent based on the total amount of the support material composition.

[24] An ink set for optical molding by an inkjet system, the ink set comprising the model material ink set according to any one of the above [1] to [19] and the support material composition according to any of the above [20] to [23].

[25] A three-dimensional shaped object constituted of a photocured product of the model material ink comprised in the model material ink set according to any one of the above [1] to [19].

[26] A method for manufacturing a three-dimensional shaped object, the method comprising manufacturing a three-dimensional shaped object by an optical molding method by an inkjet system with use of the ink set according to the above [24].

[27] The manufacturing method according to the above [26], wherein a three-dimensional molding system including at least a personal computer and a three-dimensional molding apparatus connected to the personal computer is used.

Effects of the Invention

The model material ink set of the present invention can sufficiently enhance the strength of a molded object as a photocured product of a color ink and a clear ink and prevent a color change of the molded object.

EMBODIMENTS OF THE INVENTION

Figure 1:
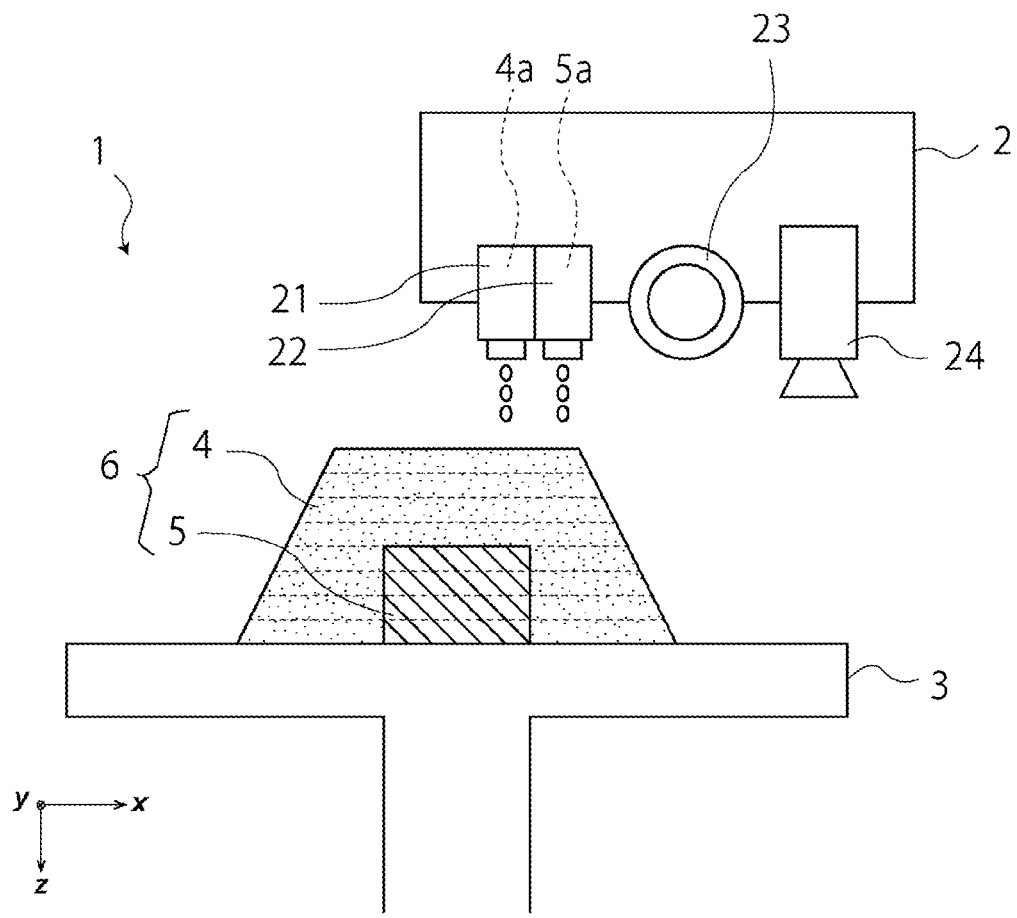
FIG. 1 is a view schematically showing a step (I) in one embodiment of a method for manufacturing a three-dimensional shaped object of the present invention.

Hereinafter, embodiments of the present invention will be described in detail. The scope of the present invention is not limited to the embodiments described herein, and various modifications can be made without departing from the spirit of the present invention.

1. Model Material Ink Set

The model material ink set of the present invention is a model material ink set for use in an optical molding method by an inkjet system, and contains a color ink and a clear ink as a model material ink. The model material ink set of the present invention can improve the appearance, particularly the surface texture, of a molded object by containing the color ink and the clear ink. In the present invention, the model material ink is a composition for constituting a model material by being photocured in an optical molding method by an inkjet system. The color ink as a model material ink is a composition to be used for constituting a colored cured product contained in the model material. The clear ink also as a model material ink is a composition to be used for constituting a non-colored or slightly colored cured product contained in the model material.

[Ethylenically Unsaturated Monomer]

The color ink and clear ink comprised in the model material ink set of the present invention each contain an ethylenically unsaturated monomer. An ethylenically unsaturated monomers is a polymerizable monomer having at least one ethylenic double bond in the molecule and having a property of being cured with energy rays. The ethylenically unsaturated monomer may be either a monofunctional ethylenically unsaturated monomer having one ethylenic double bond in the molecule or a polyfunctional ethylenically unsaturated monomer having two or more ethylenic double bonds in the molecule. Examples of the ethylenically unsaturated monomer include (meth)acrylates, (meth)acrylamides, N-vinyllactams, vinyl ethers, and maleimides. In the present specification, the "(meth)acrylate" represents both or any one of acrylate and methacrylate, and the "(meth)acrylamide" represents both or any one of acrylamide and methacrylamide.

The color ink comprised in the model material ink set of the present invention contains, as the ethylenically unsaturated monomer, 30 to 75% by mass of a (meth)acrylate and 10 to 50% by mass of an ethylenically unsaturated monomer that is not a (meth)acrylate and that contains a nitrogen atom, based on the total amount of the color ink. In the following description, the ethylenically unsaturated monomer that is not a (meth)acrylate and that contains a nitrogen atom is also referred to as a "nitrogen atom-containing ethylenically unsaturated monomer". In the present specification, the "nitrogen atom-containing ethylenically unsaturated monomer" is not a (meth)acrylate, and the "nitrogen atom-containing ethylenically unsaturated monomer" does not encompass any (meth)acrylates having a nitrogen atom.

The clear ink comprised in the model material ink set of the present invention contains, as the ethylenically unsaturated monomer, 30 to 80% by mass of a (meth)acrylate based on the total amount of the clear ink. The clear ink may or may not contain a nitrogen atom-containing ethylenically unsaturated monomer, but the content of the nitrogen atom-containing ethylenically unsaturated monomer in the clear ink is less than 10% by mass based on the total amount of the clear ink.

The model material ink set of the present invention, which contains the color ink and the clear ink having the above-described characteristics, improves the appearance quality of the molded object and sufficiently enhances the strength of the molded object, and can prevent the color change of the molded object.

The color ink contains 30 to 75% by mass of a (meth)acrylate. If the amount of the (meth)acrylate contained in the color ink is less than 30% by mass, the ink is excessively high in viscosity, so that the dischargeability sufficient for discharging the ink from an inkjet nozzle cannot be obtained. In contrast, if the amount of the (meth)acrylate contained in the color ink exceeds 75% by mass, the strength and hardness of the molded object decrease, so that a dimensionally stable molded object cannot be obtained. From the viewpoint of designing the ink to have a low viscosity and easily improving the dischargeability, the amount of the (meth)acrylate contained in the color ink is preferably 35% by mass or more, more preferably 40% by mass or more, and even more preferably 45% by mass or more. The above-mentioned amount is preferably 70% by mass or less, and more preferably 60% by mass or less from the viewpoint of easily enhancing the strength and hardness of the molded object.

The color ink contains 10 to 50% by mass of the nitrogen atom-containing ethylenically unsaturated monomer that is not a (meth)acrylate. If the amount of the nitrogen atom-containing ethylenically unsaturated monomer contained in the color ink is less than 10% by mass, the strength and hardness of the molded object decrease, so that a dimensionally stable molded object cannot be obtained. In contrast, if the amount of the nitrogen atom-containing ethylenically unsaturated monomer contained in the color ink exceeds 50% by mass, the ink is excessively high in viscosity, so that the dischargeability sufficient for discharging the ink from an inkjet nozzle cannot be obtained. The amount of the nitrogen atom-containing ethylenically unsaturated monomer contained in the color ink is preferably 15% by mass or more, and more preferably 20% by mass or more from the viewpoint of easily imparting the strength and hardness to the molded object. The above-mentioned amount is preferably 45% by mass or less, and more preferably 40% by mass or less from the viewpoint of easily designing the ink to have a low viscosity.

The clear ink contains 30 to 80% by mass of a (meth)acrylate. If the amount of the (meth)acrylate contained in the clear ink is less than 30% by mass, the ink is excessively high in viscosity, so that the dischargeability sufficient for discharging the ink from an inkjet nozzle cannot be obtained. In contrast, if the amount of the (meth)acrylate contained in the clear ink exceeds 80% by mass, the strength and hardness of the molded object decrease, so that a dimensionally stable molded object cannot be obtained. From the viewpoint of easily designing the ink to have a low viscosity, the amount of the (meth)acrylate contained in the clear ink is preferably 35% by mass or more, more preferably 40% by mass or more, and even more preferably 45% by mass or more. The above-mentioned amount is preferably 70% by mass or less, and more preferably 65% by mass or less from the viewpoint of easily imparting the strength and hardness to the molded object.

The clear ink may or may not contain a nitrogen atom-containing ethylenically unsaturated monomer, but the content of the nitrogen atom-containing ethylenically unsaturated monomer in the clear ink is less than 10% by mass based on the total amount of the clear ink. If the amount of the nitrogen atom-containing ethylenically unsaturated monomer contained in the clear ink exceeds 10% by mass, the hue of the cured product obtained by curing the clear ink with energy rays is excessively strong in yellow color, so that the color change is caused in a finally obtained, three-dimensional shaped object. The content of the nitrogen atom-containing ethylenically unsaturated monomer in the clear ink is preferably 8% by mass or less, and more preferably 5% by mass or less from the viewpoint of easily enhancing the appearance quality of the finally obtained, three-dimensional shaped object. The content of the nitrogen atom-containing ethylenically unsaturated monomer in the clear ink is preferably as small as possible and the lower limit thereof is not particularly limited, and the content is just required to be 0% by mass or more.

<(Meth)acrylate>

The (meth)acrylate contained in the color ink and the clear ink may be a monofunctional (meth)acrylate (monofunctional ethylenically unsaturated monomer), or a polyfunctional (meth)acrylate (polyfunctional ethylenically unsaturated monomer). Examples of the (meth)acrylate include alkyl (meth)acrylates having a linear or branched alkyl group, (meth)acrylates having an alicyclic group and/or an aromatic hydrocarbon group, (meth)acrylates having a heterocyclic group, (meth)acrylates having a linear or branched alkylene group, and alkylene glycol (meth)acrylates having a linear or branched alkylene glycol group. The (meth)acrylates may be used alone, or two or more thereof may be used in combination. It is noted that the alicyclic group is a group including an aliphatic cyclic structure in which carbon atoms are cyclically bonded, the aromatic hydrocarbon group is a group including an aromatic cyclic structure in which carbon atoms are cyclically bonded, and the heterocyclic group is a group including a structure in which carbon atoms and one or more hetero atoms are cyclically bonded.

Examples of the linear or branched alkyl group in the alkyl (meth)acrylates include preferably alkyl groups having 4 to 30 carbon atoms, and more preferably those having 6 to 25 carbon atoms, and specific examples thereof include an octyl group, an isooctyl group, a 2-ethylhexyl group, a nonyl group, an isononyl group, a lauryl group, a stearyl group, an isostearyl group, and a t-butyl group. The alkyl (meth)acrylate is usually a monofunctional (meth)acrylate.

Examples of the alicyclic group and aromatic hydrocarbon group in the (meth)acrylate having an alicyclic group and/or an aromatic hydrocarbon group include preferably alicyclic groups and aromatic hydrocarbon groups having 6 to 20 carbon atoms, and more preferably those having 8 to 14 carbon atoms. Examples of the alicyclic group include a cyclohexyl group, a 4-t-butylcyclohexyl group, an isobornyl group, a dicyclopentanyl group, a tricyclodecyl group, and an adamantyl group. Examples of the aromatic hydrocarbon group include a phenoxyethyl group, an ethoxylated phenyl group (e.g., a 2-(2-ethoxyethoxy)phenyl) group, a phenylphenol group, and a fluorene group. The (meth)acrylate having an alicyclic group and/or an aromatic hydrocarbon group may be either monofunctional or polyfunctional, but it is preferably a monofunctional (meth)acrylate.

Examples of the heterocyclic group in the (meth)acrylate having a heterocyclic group include preferably heterocyclic groups having 5 to 20 carbon atoms, and more preferably those having 5 to 14 carbon atoms. Examples of the (meth)acrylates having a heterocyclic group include tetrahydrofurfuryl (meth)acrylate, 4-(meth)acryloyloxymethyl-2-methyl-2-ethyl-1,3-dioxolane, and 4-(meth)acryloyloxymethyl-2-cyclohexyl-1,3-dioxolane. The (meth)acrylate having a heterocyclic group may be either monofunctional or polyfunctional, but it is preferably a monofunctional (meth)acrylate.

Examples of the alkylene group in the (meth)acrylate having a linear or branched alkylene group include preferably alkylene groups having 2 to 30 carbon atoms, and more preferably those having 3 to 20 carbon atoms. Examples of such alkylene groups include a pentaerythritol group, a dipentaerythritol group, and a dimethyloltricyclodecane group. Examples of the (meth)acrylate having a linear or branched alkylene group include specifically pentaerythritol tri(meth)acrylate, dipentaerythritol hexa(meth)acrylate, and dimethyloltricyclodecane di(meth)acrylate. The (meth)acrylate having a linear or branched alkylene group is usually a polyfunctional (meth)acrylate, and is preferably a polyfunctional (meth)acrylate having 2 to 10, and more preferably 2 to 6 (meth)acrylate groups.

Examples of the alkylene glycol group in the (meth)acrylate having a linear or branched alkylene glycol group include preferably alkylene glycol groups having 4 to 25 carbon atoms, and more preferably those having 6 to 20 carbon atoms. Examples of the alkylene glycol group include a tripropylene glycol group, a 1,6-hexanediol group, a neopentyl glycol group, a 1,9-nonanediol group, a 3-methyl-1,5-pentanediol group, a 2-n-butyl-2-ethyl-1,3-propanediol group, a pentaerythritol group, (n)ethylene glycol groups such as a diethylene glycol group and a triethylene glycol group, and (n)propylene glycol groups such as a dipropylene glycol group and a tripropylene glycol group. Examples of the (meth)acrylate having a linear or branched alkylene glycol group include specifically di(meth)acrylates of the above-mentioned alkylene glycols and tri(meth)acrylates of the above-mentioned alkylene glycols. The (meth)acrylate having a linear or branched alkylene glycol group may be either monofunctional or polyfunctional, but it is preferably a polyfunctional (meth)acrylate having 1 to 6, more preferably 2 or 3 (meth)acrylate groups.

From the viewpoint of easily reducing the viscosity of the model material ink to enhance the dischargeability in inkjet and easily enhancing the strength and hardness of the three-dimensional shaped object, the color ink and the clear ink each preferably contain the (meth)acrylate having an alicyclic group and/or an aromatic hydrocarbon group as the (meth)acrylate.

From the viewpoint of easily reducing the viscosity of the model material ink to enhance the dischargeability in inkjet, the color ink and the clear ink preferably contain the (meth)acrylate having an alicyclic group as the (meth)acrylate, and more preferably contain isobornyl (meth)acrylate and/or cyclohexyl (meth) acrylate.

From the viewpoint of easily enhancing the strength and hardness of the three-dimensional shaped object, the clear ink preferably contains the (meth)acrylate having an aromatic hydrocarbon group as the (meth)acrylate, and more preferably contains phenoxyethyl (meth)acrylate and/or an ethoxylated phenyl (meth)acrylate (e.g., 2-(2-ethoxyethoxy) phenyl (meth)acrylate).

<Nitrogen Atom-Containing Ethylenically Unsaturated Monomer>

The ethylenically unsaturated monomer that is contained in the color ink as well as that is not a (meth)acrylate and that contains a nitrogen atom may be either a monofunctional nitrogen atom-containing ethylenically unsaturated monomer (monofunctional ethylenically unsaturated monomer), or a polyfunctional nitrogen atom-containing ethylenically unsaturated monomer (poly functional ethylenically unsaturated monomer). Examples of the nitrogen atom-containing ethylenically unsaturated monomer include (meth)acrylamides, N-vinyllactams, maleimides, and N-vinylformamide.

Examples of the (meth)acrylamides include monofunctional and polyfunctional (meth)acrylamide compounds represented by the following formula (I):

[Chemical Formula 1]

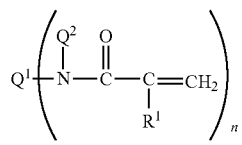

(I)

wherein, $Q^1$ represents an n-valent linking group, $Q^2$s each independently represent a hydrogen atom or a monovalent organic group, $R^1$s each independently represent a hydrogen atom or a methyl group, and n represents an integer of 1 or 2 or more,
and monofunctional compounds represented by the following formula (II):

[Chemical Formula 2]

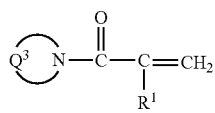

(II)

wherein, $Q^3$ represents an optionally substituted divalent linking group which forms an alicyclic structure together with an N atom, and $R^1$ represents a hydrogen atom or a methyl group. From the viewpoint of easily designing the ink to have a low viscosity to enhance the dischargeability, the (meth)acrylamide is preferably monofunctional. Examples of the monofunctional compounds represented by the formula (I) and the formula (II) include (meth)acrylamides wherein $Q^1$ in the formula (I) is preferably a linear or branched alkyl group having 1 to 10 carbon atoms, and $Q^2$ is preferably a linear or branched alkyl group having 1 to 10 carbon atoms and/or a hydrogen atom [e.g., N,N-dimethylacrylamide, N,N-diethylacrylamide, and N-isopropylacrylamide], hydroxyalkyl(meth)acrylamides wherein $Q^1$ in the formula (I) preferably has a linear or branched hydroxyalkyl group having 2 to 10 carbon atoms, and $Q^2$ is a hydrogen atom [e.g., hydroxyethylacrylamide and hydroxypropylacrylamide], (meth)acrylamides wherein $Q^1$ in the formula (I) preferably has an alicyclic group having 3 to 20 carbon atoms and $Q^2$ is preferably a linear or branched alkyl group having 1 to 10 carbon atoms and/or a hydrogen atom, and (meth)acrylamides wherein $Q^3$ in the formula (II) preferably has 4 to 20 carbon atoms and constitutes an alicyclic group [e.g., acryloylmorpholine].

The N-vinyllactams may be either monofunctional or polyfunctional, and examples thereof include compounds represented by the following formula (III):

[Chemical Formula 3]

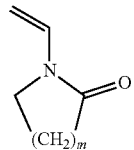

(III)

wherein m represents an integer of 1 to 5. From the viewpoint of easily obtaining raw materials, m is preferably an integer of 2 to 4, and more preferably 2 or 4. Examples of such N-vinyllactams include specifically N-vinylpyrrolidone and N-vinylcaprolactam.

From the viewpoint of easily enhancing the strength and hardness of the three-dimensional shaped object, the nitrogen atom-containing ethylenically unsaturated monomer that is contained in the color ink as well as that is not a (meth)acrylate and that contains a nitrogen atom is preferably selected from the group consisting of (meth)acrylamides and N-vinyllactams, and is more preferably a (meth)acrylamide, and is even more preferably a (meth)acrylamide wherein $Q^3$ in the formula (II) has 4 to 20 carbon atoms and constitutes an alicyclic group (especially, acryloylmorpholine).

<Monofunctional and Di- or More Functional Ethylenically Unsaturated Monomer>

The color ink and clear ink comprised in the model material ink set of the present invention each preferably contain, as the ethylenically unsaturated monomer, a monofunctional ethylenically unsaturated monomer and a di- or more functional ethylenically unsaturated monomer. Examples of the monofunctional ethylenically unsaturated monomer include the monofunctional (meth)acrylates and the monofunctional nitrogen atom-containing ethylenically unsaturated monomers mentioned above. Examples of the di- or more functional ethylenically unsaturated monomers include the polyfunctional (meth)acrylates and the polyfunctional nitrogen atom-containing ethylenically unsaturated monomers mentioned above. When the color ink and clear ink comprised in the model material ink set of the present invention contain the di- or more functional ethylenically unsaturated monomer in addition to the monofunctional ethylenically unsaturated monomer, a molded object (a model material) as a photocured product of a model material ink is reduced in brittleness and is easily improved in strength.

The content of the monofunctional ethylenically unsaturated monomer in the color ink is preferably 30 to 70% by mass, more preferably 35 to 70% by mass, and even more preferably 40 to 65% by mass based on the total amount of the color ink. When the content of the monofunctional ethylenically unsaturated monomer in the color ink is equal to or more than the above-mentioned lower limit, this is preferable because it is easy to reduce the viscosity of the ink and enhance the dischargeability. Meanwhile, when it is equal to or less than the above-mentioned upper limit, this is preferable because it is easy to enhance the strength and hardness of the photocured product of the color ink and it is easy to suppress the stickiness of the surface of the molded object.

The content of the di- or more functional ethylenically unsaturated monomer in the color ink is preferably 5 to 50% by mass, more preferably 10 to 40% by mass, and even more preferably 10 to 35% by mass based on the total amount of the color ink. When the content of the di- or more functional ethylenically unsaturated monomer in the color ink is equal to or more than the above-mentioned lower limit, this is preferable because it is easy to reduce the brittleness of the photocured product of the color ink and it is easy to improve the strength and hardness of the molded object. Meanwhile, when it is equal to or less than the above-mentioned upper limit, this is preferable because it is easy to suppress the cure shrinkage in the photocured product of the color ink and the dimensional accuracy (or warpage prevention property) of the molded object improves.

The content of the monofunctional ethylenically unsaturated monomer in the clear ink is preferably 20 to 70% by mass, more preferably 25 to 70% by mass, and even more preferably 30 to 65% by mass based on the total amount of the clear ink. When the content of the monofunctional ethylenically unsaturated monomer in the clear ink is equal to or more than the above-mentioned lower limit, this is preferable because it is easy to design the clear ink to have a low viscosity. Meanwhile, when it is equal to or less than the above-mentioned upper limit, this is preferable because it is easy to enhance the hardness and strength of the molded object.

The content of the di- or more functional ethylenically unsaturated monomer in the clear ink is preferably 5 to 50% by mass, more preferably 10 to 40% by mass, and even more preferably 10 to 35% by mass based on the total amount of the clear ink. When the content of the di- or more functional ethylenically unsaturated monomer in the clear ink is equal to or more than the above-mentioned lower limit, this is preferable because it is easy to enhance the hardness and strength of the molded object. Meanwhile, when it is equal to or less than the above-mentioned upper limit, this is preferable because it is easy to reduce the cure shrinkage or warpage in the molded object and it is easy to improve the dimensional accuracy.

In one preferred embodiment of the present invention, the color ink preferably contains the above-mentioned monofunctional (meth)acrylate having an alicyclic group, the polyfunctional (meth)acrylate, and the monofunctional nitrogen atom-containing ethylenically unsaturated monomer. When the color ink of the present invention preferably contains the monofunctional (meth)acrylate having an alicyclic group and the polyfunctional (meth)acrylate, it is easy to reduce the viscosity of the ink and to enhance the dischargeability, and at the same time, it is also easy to reduce the brittleness of the model material as the photocured product of the model material ink and to improve the strength and hardness of the molded object. Furthermore, when the color ink of the present invention contains the monofunctional nitrogen atom-containing ethylenically unsaturated monomer, it is easy to improve the strength of the molded object as the photocured product of the model material ink. In this embodiment, from the viewpoint of easily obtaining the above-mentioned effects, the content of the monofunctional (meth)acrylate having an alicyclic group in the color ink is preferably 5 to 75% by mass, more preferably 10 to 60% by mass, and the content of the polyfunctional (meth)acrylate is preferably 5 to 50% by mass, more preferably 10 to 45% by mass, and the content of the monofunctional nitrogen atom-containing ethylenically unsaturated monomer is preferably 5 to 50% by mass, more preferably 10 to 40% by mass.

Further, in one preferred embodiment of the present invention, the clear ink preferably contains the above-mentioned monofunctional (meth)acrylate and the polyfunctional (meth)acrylate. As the monofunctional (meth)acrylate, it is more preferable to contain the above-mentioned (meth)acrylate having an alicyclic group and/or the (meth) acrylate having an aromatic hydrocarbon group. In this embodiment, the content of the monofunctional (meth) acrylate in the clear ink is preferably 30 to 80% by mass, more preferably 40 to 70% by mass, and the content of the polyfunctional (meth)acrylate is preferably 5 to 50% by mass, more preferably 10 to 40% by mass.

[Polymerizable Oligomer]

The color ink and clear ink comprised in the model material ink set of the present invention each preferably further contain a polymerizable oligomer. When the model material ink contains a polymerizable oligomer, it is easy to reduce the brittleness of the molded object and impart strength and hardness to the molded object, and the molded object becomes difficult to break even when it is bent. In addition, the tackiness of the surface of the molded object can be easily reduced.

The polymerizable oligomer is a photocurable component having a property of being cured by energy rays. In the present description, the "oligomer" refers to an oligomer having a weight average molecular weight Mw of 1,000 to 10,000. More preferably, the oligomer refers to an oligomer in which the lower limit of the weight average molecular weight Mw exceeds 1,000. The weight average molecular weight Mw means a weight average molecular weight in terms of polystyrene measured by GPC (Gel Permeation Chromatography). When the model material ink contains a polymerizable oligomer, it may contain either one compound or two or more compounds as the polymerizable oligomer.

Examples of the polymerizable oligomer include an epoxy (meth)acrylate oligomer, a polyester (meth)acrylate oligomer, and a urethane (meth)acrylate oligomer. These may be used alone, or two or more thereof may be used in combination. From the viewpoint of being capable of imparting the strength and the toughness to the molded object, offering a wide range of material selection, and allowing selection of a material having various characteristics, the polymerizable oligomer to be suitably used is preferably a polymerizable oligomer having a urethane group, and more preferably a urethane (meth)acrylate oligomer.

From the viewpoint of easily designing the ink to have a low viscosity, easily enhancing the hardness and strength of the molded object, and easily reducing the cure shrinkage, the polymerizable oligomer having a urethane group is preferably a caprolactone-modified polymerizable oligomer. When the color ink contains a polymerizable oligomer, the polymerizable oligomer is preferably a caprolactone-modified, isophorone diisocyanate-based polymerizable oligomer from the viewpoint of easily enhancing the hardness and strength of a molded object. When the clear ink contains a polymerizable oligomer, the polymerizable oligomer is preferably a caprolactone-modified, dicyclohexylmethane diisocyanate-based polymerizable oligomer from the viewpoint of easily suppressing the color change.

When the model material ink contains a polymerizable oligomer, the content of the polymerizable oligomer in each of the color ink and the clear ink is preferably 10 to 45% by mass, and more preferably 15 to 30% by mass based on the total amount of each ink (the color ink or the clear ink). When the content of the polymerizable oligomer is equal to or more than the above-mentioned lower limit, the tackiness of the surface of a cured product is easy to be sufficiently reduced. When the content of the polymerizable oligomer is equal to or less than the above-mentioned upper limit, the viscosity of the model material ink does not become excessively high, and the dischargeability and the like can be easily improved.

[Other Additives]

The color ink and the clear ink may, if necessary, contain other additives as long as the effects of the present invention are not impaired. Examples of the other additives include photopolymerization initiators, surface adjusting agents, preservation stabilizers, antioxidants, coloring agents, ultraviolet absorbing agents, light stabilizers, polymerization inhibitors, chain transfer agents, and fillers.

<Photopolymerization Initiator>

The photopolymerization initiator is not particularly limited as long as it is a compound that promotes a radical reaction when being irradiated with ultraviolet rays, near ultraviolet rays or light having a wavelength in the visible light region. Examples of the photopolymerization initiator include benzoin compounds having 14 to 18 carbon atoms [e.g., benzoin, benzoin methyl ether, benzoin ethyl ether, benzoin propyl ether, and benzoin isobutyl ether], acetophenone compounds having 8 to 18 carbon atoms [e.g., acetophenone, 2,2-diethoxy-2-phenylacetophenone, 2,2-diethoxy-2-phenylacetophenone, 1,1-dichloroacetophenone, 2-hydroxy-2-methyl-phenylpropan-1-one, diethoxy acetophenone, 1-hydroxycyclohexyl phenyl ketone, and 2-methyl-1-[4-(methylthio)phenyl]-2-morpholinopropan-1-one], anthraquinone compounds having 14 to 19 carbon atoms [e.g., 2-ethylanthraquinone, 2-t-butylanthraquinone, 2-chloroanthraquinone, and 2-amylanthraquinone], thioxanthone compounds having 13 to 17 carbon atoms [e.g., 2,4-diethylthioxanthone, 2-isopropylthioxanthone, and 2-chlorothioxanthone], ketal compounds having 16 to 17 carbon atoms [e.g., acetophenonedimethylketal and benzyldimethylketal], benzophenone compounds having 13 to 21 carbon atoms [e.g., benzophenone, 4-benzoyl-4'-methyldiphenyl sulfide, and 4,4'-bismethylaminobenzophenone], acylphosphine oxide compounds having 22 to 28 carbon atoms [e.g., 2,4,6-trimethylbenzoyl-diphenyl-phosphine oxide, bis-(2,6-dimethoxybenzoyl)-2,4,4-trimethylpentylphosphine oxide, and bis(2,4,6-trimethylbenzoyl)-phenylphosphine oxide], and mixtures of these compounds. These may be used alone, or two or more thereof may be used in combination. Among these, 2,4,6-trimethylbenzoyl-diphenyl-phosphine oxide is preferable in that the three-dimensional shaped object obtained when the model material ink is photocured is hard to be yellowing and that the resulting three-dimensional shaped object has high light resistance etc. and is hard to be yellowing with time. Additionally, examples of an available acylphosphine oxide compound include DAROCURE TPO manufactured by BASF SE.

When the color ink and the clear ink contain a photopolymerization initiator, the content of the photopolymerization initiator in each of the color ink and the clear ink is preferably 2 to 15% by mass, and more preferably 3 to 10% by mass based on the total amount of each ink. When the content of the photopolymerization initiator is equal to or more than the above-mentioned lower limit, unreacted polymer components are sufficiently reduced and the curability of the three-dimensional shaped object is easily enhanced. On the other hand, when the content of the photopolymerization initiator is equal to or less than the above-mentioned upper limit, the remaining amount of the unreacted photopolymerization initiator can be easily reduced, and the yellowing of the three-dimensional shaped object caused by remaining of the unreacted photopolymerization initiator in the model material can be easily prevented.

<Surface Adjusting Agent>

The surface adjusting agent is a component that adjusts the surface tension of the color ink and clear ink to an appropriate range, and the type thereof is not particularly limited. By setting the surface tension of the color ink and clear ink to an appropriate range, the dischargeability can be stabilized and the interface mixing between the model material ink and the support material ink can be suppressed. As a result, a molded object with good dimensional accuracy can be obtained. Examples of the surface adjusting agent include silicone-based compounds. Examples of the silicone-based compounds include silicone-based compounds having a polydimethylsiloxane structure. Specific examples thereof include polyether-modified polydimethylsiloxane, polyester-modified polydimethylsiloxane, and polyaralkyl-modified polydimethylsiloxane. As these, BYK-300, BYK-302, BYK-306, BYK-307, BYK-310, BYK-315, BYK-320, BYK-322, BYK-323, BYK-325, BYK-330, BYK-331, BYK-333, BYK-337, BYK-344, BYK-370, BYK-375, BYK-377, BYK-UV3500, BYK-UV3510, BYK-UV3570 (manufactured by BYK-Chemie GmbH), TEGO-Rad 2100, TEGO-Rad 2200N, TEGO-Rad 2250, TEGO-Rad 2300, TEGO-Rad 2500, TEGO-Rad 2600, TEGO-Rad 2700 (manufactured by Degussa AG), Granol 100, Granol 115, Granol 400, Granol 410, Grand 435, Granol 440, Granol 450, B-1484, POLYFLOW ATF-2, KL-600, UCR-L72, UCR-L93 (manufactured by KYOEISHA CHEMICALS Co., LTD.) and the like under the trade names may be used. These may be used alone, or two or more thereof may be used in combination.

When the color ink and the clear ink contain a surface adjusting agent, the content of the surface adjusting agent in each of the color ink and the clear ink is preferably 0.005% by mass or more, more preferably 0.01% by mass or more, and is preferably 3.0% by mass or less, more preferably 1.5% by mass or less based on the total amount of each ink. When the content of the surface adjusting agent is within the above-mentioned range, it is easy to adjust the surface tension of each of the color ink and the clear ink to an appropriate range.

The preservation stabilizer is a component that can enhance the preservation stability of the color ink and clear ink. Additionally, head clogging caused by polymerization of a polymerizable compound with heat energy can be prevented. When the color ink and the clear ink contain a preservation stabilizer, the content of the preservation stabilizer is preferably 0.05 to 3.0% by mass based on the total amount of each ink from the viewpoint of easily obtaining the above effects.

Examples of the preservation stabilizer include hindered amine-based compounds (HALS), phenol-based antioxidants, and phosphorus-based antioxidants. Examples of the preservation stabilizer include hydroquinone, methoquinone, benzoquinone, p-methoxyphenol, hydroquinone monomethyl ether, hydroquinone monobutyl ether, TEMPO, 4-hydroxy-TEMPO, TEMPOL, Cupferron AI, IRGASTAB UV-10, IRGASTAB UV-22, FIRSTCURE ST-1 (manufactured by ALBEMARLE Corporation), t-butylcatechol, pyrogallol, TINUVIN 111 FDL, TINUVIN 144, TINUVIN 292, TINUVIN XP40, TINUVIN XP60, and TINUVIN 400 manufactured by BASF SE. These may be used alone, or two or more thereof may be used in combination.

[Color Ink]

The color ink in the model material ink set of the present invention is usually a colored ink containing a pigment. The content of the pigment in the color ink may be appropriately set according to the desired color tone of the color ink and the type of the pigment to be used, but is usually 0.1% by mass or more, and more preferably 0.2% by mass or more based on the total amount of the color ink. The upper limit of the content of the pigment in the color ink is not also particularly limited, and it is usually 5.0% by mass or less, and preferably 3.0% by mass or less based on the total amount of the color ink. Although the constitution of the color ink is not particularly limited, the constitution preferably contains cyan, magenta and yellow, and more preferably further contains white and/or black.

From the viewpoint of color tone and color development as well as ease of pigment dispersion, cyan preferably contains at least one pigment selected from the group consisting of C.I. Pigment Blue 15:3 and C.I. Pigment Blue 15:4.

From the viewpoint of color tone and color development as well as ease of pigment dispersion, magenta preferably contains at least one pigment selected from the group consisting of C.I. Pigment Red 122, C.I. Pigment Red 202, and C.I. Pigment Violet 19.

From the viewpoint of color tone and color development as well as ease of pigment dispersion, yellow preferably contains at least one pigment selected from the group consisting of C.I. Pigment Yellow 150 and C.I. Pigment Yellow 155.

From the viewpoint of color tone and concealability as well as ease of pigment dispersion, white preferably contains titanium oxide. From the viewpoint of easily improving the light stability of the ink, titanium oxide is more preferably rutile type titanium oxide.

From the viewpoint of color tone and color development as well as ease of pigment dispersion, black preferably contains carbon black.

From the viewpoint of making the dischargeability from an inkjet head good, the viscosity of the color ink is preferably 100 mPa·s or less at 25° C. The viscosity of the color ink is preferably 30 mPa·s or more at 25° C. The viscosity can be measured using an R100 type viscometer in accordance with JIS Z 8 803.

[Clear Ink]

The clear ink in the model material ink set of the present invention is a highly transparent ink containing no pigment or containing only a small amount of pigment and/or dye such as a bluing agent. The content of the pigment in the clear ink is usually 0.1% by mass or less, and more preferably 0.05% by mass or less based on the total amount of the clear ink. The lower limit of the content of the pigment in the clear ink is 0% by mass or more.

From the viewpoint of making the dischargeability from an inkjet head good, the viscosity of the clear ink is preferably 100 mPa·s or less at 25° C. The viscosity of the clear ink is preferably 30 mPa·s or more at 25° C. The viscosity can be measured using an R100 type viscometer in accordance with JIS Z 8 803.

The method for manufacturing the color ink and the clear ink is not particularly limited, and for example, the inks can be manufactured by uniformly mixing the above-described components using a mixing and stirring device or the like.

2. Support Material Composition

When a three-dimensional shaped object having a complicated shape such as a hollow shape is molded using an optical molding method by an inkjet system, the three-dimensional shaped object may be molded by combining a model material obtained by photocuring the above-described model material ink set of the present invention with a support material in order to support the model material. The support material composition is a resin composition for a support material which affords a support material by photocuring. After the model material is fabricated, the support material can be removed from the model material by physical peeling or dissolving the support material in an organic solvent or water. The support material composition of the present invention is a composition to be used as an ink together with the model material ink set of the present invention described above.

The support material composition of the present invention contains a monofunctional ethylenically unsaturated monomer and a polyalkylene glycol having an oxyethylene group and/or an oxypropylene group.

<Monofunctional Ethylenically Unsaturated Monomer>

The support material composition of the present invention contains a monofunctional ethylenically unsaturated monomer. The monofunctional ethylenically unsaturated monomer contained in the support material composition is a polymerizable monomer having one ethylenic double bond in the molecule and having a property of being cured by energy rays, and is preferably a water-soluble monofunctional ethylenically unsaturated monomer. Examples of the monofunctional ethylenically unsaturated monomer contained in the support material composition include hydroxy group-containing (meth)acrylates having 5 to 15 carbon atoms [e.g., hydroxyethyl (meth)acrylate, hydroxypropyl (meth)acrylate, and 4-hydroxybutyl (meth)acrylate], hydroxy group-containing (meth)acrylates having a number average molecular weight (Mn) of 200 to 1,000 [e.g., polyethylene glycol mono(meth)acrylate, monoalkoxy(1 to 4 carbon atoms)polyethylene glycol mono(meth)acrylate, polypropylene glycol mono(meth)acrylate, monoalkoxy(1 to 4 carbon atoms)polypropylene glycol mono(meth)acrylate, and mono(meth)acrylate of PEG-PPG block polymer], (meth)acrylamide derivatives having 3 to 15 carbon atoms [e.g., (meth)acrylamide, N-methyl(meth)acrylamide, N-ethyl(meth)acrylamide, N-propyl(meth)acrylamide, N-butyl(meth)acrylamide, N,N'-dimethyl(meth)acrylamide, N,N'-diethyl(meth)acrylamide, N-hydroxyethyl(meth)acrylamide, N-hydroxypropyl(meth)acrylamide, and N-hydroxybutyl(meth)acrylamide], and (meth)acryloylmorpholine. These may be used alone, or two or more thereof may be used in combination.

From the viewpoint of improving the curability of the support material composition, and easily and rapidly dissolving in water the support material obtained by photocuring the support material composition, the content of the monofunctional ethylenically unsaturated monomer contained in the support material composition is preferably 20% by mass or more, and more preferably 25% by mass or more based on the total amount of the support material composition. The content is preferably 50% by mass or less, and more preferably 45% by mass or less.

<Polyalkylene Glycol Containing Oxyethylene Group and/or Oxypropylene Group>

The support material composition of the present invention contains a polyalkylene glycol containing an oxyethylene group and/or an oxypropylene group. The polyalkylene glycol containing an oxyethylene group and/or an oxypropylene group is such that at least ethylene oxide and/or propylene oxide is added to an active hydrogen compound. Examples of the polyalkylene glycol include polyethylene glycol and polypropylene glycol. These may be used alone, or two or more thereof may be used in combination. Examples of the active hydrogen compound include monohydric to tetrahydric alcohols and amine compounds. Among these, a dihydric alcohol or water is preferable.

From the viewpoint of easily enhancing the solubility in water of the support material obtained by photocuring the support material composition, the content of the polyalkylene glycol in the support material composition of the present invention is preferably 20% by mass or more, and more preferably 25% by mass or more based on the total amount of the support material composition. In addition, from the viewpoint of preventing the phenomenon in which the polyalkylene glycol leaks out of the support material during molding a three-dimensional shaped object and enhancing the preciseness of molding, the content is preferably 49% by mass or less, and more preferably 45% by mass or less.

The number average molecular weight Mn of the polyalkylene glycol is preferably 100 to 5,000. When the Mn of the polyalkylene glycol is within the above-mentioned range, it is compatibilized with the polyalkylene glycol before photocuring and is not compatibilized with the polyalkylene glycol after photocuring. As a result, the self-standing of the support material obtained by photocuring the support material composition can be enhanced, and the solubility of the support material in water can be enhanced. The Mn of the polyalkylene glycol is preferably 200 to 3,000, and more preferably 400 to 2,000.

<Other Additives>

The support material composition may, if necessary, contain other additives as long as the effects of the present invention are not impaired. Examples of the other additives include photopolymerization initiators, water-soluble organic solvents, antioxidants, coloring agents, pigment dispersants, preservation stabilizers, ultraviolet absorbing agents, light stabilizers, polymerization inhibitors, chain transfer agents, and fillers.

(Photopolymerization Initiator)

As the photopolymerization initiator, the compounds described above may be similarly used as the photopolymerization initiator which may be contained in the model material ink. When the support material composition contains a photopolymerization initiator, the content of the photopolymerization initiator is preferably 2 to 20% by mass, and more preferably 3 to 10% by mass based on the total amount of the support material composition. When the content of the photopolymerization initiator is equal to or more than the above-mentioned lower limit, unreacted polymer components are sufficiently reduced and the curability of the support material is easily enhanced. On the other hand, when the content of the photopolymerization initiator is equal to or less than the above-mentioned upper limit, it is easy to prevent the unreacted photopolymerization initiator from remaining in the support material.

(Water-Soluble Organic Solvent)

The water-soluble organic solvent is a component that improves the solubility in water of the support material obtained by photocuring the support material composition. Moreover, it is also a component that adjusts the support material composition to have a low viscosity. When the support material composition contains a water-soluble organic solvent, the content of the water-soluble organic solvent is preferably 35% by mass or less, and more preferably 30% by mass or less based on the total amount of the support material composition. The content is preferably 3% by mass or more, more preferably 5% by mass or more, and even more preferably 10% by mass or more. When the amount of the water-soluble organic solvent in the support material composition is excessively large, effusion of the water-soluble organic solvent occurs when the support material composition is photocured, so that the dimensional accuracy of the model material formed on the upper layer of the support material may deteriorate. When the content of the water-soluble organic solvent is less than or equal to the above-mentioned upper limit, it is easy to suppress such effusion. In addition, when the content of the water-soluble organic solvent in the support material composition is equal to or more than the above-mentioned lower limit, it is easy to improve the solubility of the support material in water and it is also easy to adjust the support material composition to have a low viscosity.

Examples of the water-soluble organic solvent include alkylene glycol monoacetates having a linear or branched alkylene group [e.g., ethylene glycol monoacetate, propylene glycol monoacetate, diethylene glycol monoacetate, dipropylene glycol monoacetate, triethylene glycol monoacetate, tripropylene glycol monoacetate, tetraethylene glycol monoacetate, and tetrapropylene glycol monoacetate], alkylene glycol monoalkyl ethers having a linear or branched alkylene group [e.g., ethylene glycol monomethyl ether, propylene glycol monomethyl ether, diethylene glycol monomethyl ether, dipropylene glycol monomethyl ether, triethylene glycol monomethyl ether, tripropylene glycol monomethyl ether, tetraethylene glycol monomethyl ether, tetrapropylene glycol monomethyl ether, ethylene glycol monoethyl ether, propylene glycol monoethyl ether, diethylene glycol monoethyl ether, dipropylene glycol monoethyl ether, triethylene glycol monoethyl ether, tripropylene glycol monoethyl ether, tetraethylene glycol monoethyl ether, tetrapropylene glycol monoethyl ether, ethylene glycol monopropyl ether, propylene glycol monopropyl ether, diethylene glycol monopropyl ether, dipropylene glycol monopropyl ether, triethylene glycol monopropyl ether, tripropylene glycol monopropyl ether, tetraethylene glycol monopropyl ether, tetrapropylene glycol monopropyl ether, ethylene glycol monobutyl ether, propylene glycol monobutyl ether, diethylene glycol monobutyl ether, dipropylene glycol monobutyl ether, triethylene glycol monobutyl ether, tripropylene glycol monobutyl ether, tetraethylene glycol monobutyl ether, and tetrapropylene glycol monobutyl ether], alkylene glycol diacetates having a linear or branched alkylene group [e.g., ethylene glycol diacetate, propylene glycol diacetate, diethylene glycol diacetate, dipropylene glycol diacetate, triethylene glycol diacetate, tripropylene glycol diacetate, tetraethylene glycol diacetate, and tetrapropylene glycol diacetate], alkylene glycol dialkyl ethers having a linear or branched alkylene group [e.g., ethylene glycol dimethyl ether, propylene glycol dimethyl ether, diethylene glycol dimethyl ether, dipropylene glycol dimethyl ether, triethylene glycol dimethyl ether, tripropylene glycol dimethyl ether, tetraethylene glycol dimethyl ether, tetrapropylene glycol dimethyl ether, ethylene glycol diethyl ether, propylene glycol diethyl ether, diethylene glycol diethyl ether, dipropylene glycol diethyl ether, triethylene glycol diethyl ether, tripropylene glycol diethyl ether, tetraethylene glycol diethyl ether, tetrapropylene glycol diethyl ether, ethylene glycol dipropyl ether, propylene glycol dipropyl ether, diethylene glycol dipropyl ether, dipropylene glycol dipropyl ether, triethylene glycol dipropyl ether, tripropylene glycol dipropyl ether, tetraethylene glycol dipropyl ether, tetrapropylene glycol dipropyl ether, ethylene glycol dibutyl ether, propylene glycol dibutyl ether, diethylene glycol dibutyl ether, dipropylene glycol dibutyl ether, triethylene glycol dibutyl ether, tripropylene glycol dibutyl ether, tetraethylene glycol dibutyl ether, and tetrapropylene glycol dibutyl ether], alkylene glycol monoalkyl ether acetates having a linear or branched alkylene group [e.g., ethylene glycol monomethyl ether acetate, propylene glycol monomethyl ether acetate, diethylene glycol monomethyl ether acetate, dipropylene glycol monomethyl ether acetate, triethylene glycol monomethyl ether acetate, tripropylene glycol monomethyl ether acetate, tetraethylene glycol monomethyl ether acetate, tetrapropylene glycol monomethyl ether acetate, ethylene glycol monoethyl ether acetate, propylene glycol monoethyl ether acetate, diethylene glycol monoethyl ether acetate, dipropylene glycol monoethyl ether acetate, triethylene glycol monoethyl ether acetate, tripropylene glycol monoethyl ether acetate, tetraethylene glycol monoethyl ether acetate, tetrapropylene glycol monoethyl ether acetate, ethylene glycol monopropyl ether acetate, propylene glycol monopropyl ether acetate, diethylene glycol monopropyl ether acetate, dipropylene glycol monopropyl ether acetate, triethylene glycol monopropyl ether acetate, tripropylene glycol monopropyl ether acetate, tetraethylene glycol monopropyl ether acetate, tetrapropylene glycol monopropyl ether acetate, ethylene glycol monobutyl ether acetate, propylene glycol monobutyl ether acetate, diethylene glycol monobutyl ether acetate, dipropylene glycol monobutyl ether acetate, tripropylene glycol monobutyl ether acetate, tetraethylene glycol monobutyl ether acetate, and tetrapropylene glycol monobutyl ether acetate]. These may be used alone, or two or more thereof may be used in combination. Among these, the water-soluble organic solvent is more preferably triethylene glycol monomethyl ether or dipropylene glycol monomethyl ether acetate from the viewpoint of easily improving the solubility of the support material in water and easily adjusting the support material composition to have a low viscosity.

From the viewpoint of making the dischargeability from an inkjet head good, the viscosity of the support material composition of the present invention is preferably 100 mPa·s or less at 25° C. The viscosity of the support material composition is preferably 30 mPa·s or more at 25° C. The viscosity can be measured using an R100 type viscometer in accordance with JIS Z 8 803.

The method for manufacturing the support material composition of the present invention is not particularly limited. For example, it can be manufactured by mixing the above-described components uniformly using a mixing and stirring apparatus or the like.

3. Ink Set for Optical Molding

The present invention also provides an ink set for optical molding by an inkjet system, the ink set comprising the above-described model material ink set of the present invention and the above-described support material composition of the present invention. For example, when the constitution of the color ink comprised in the model material ink set comprises cyan, magenta and yellow, the ink set of the present invention is an ink set comprising three color inks having respective colors of cyan, magenta and yellow, a clear ink, and an ink of the support material composition.

4. Three-Dimensional Shaped Object and Method for Manufacturing the Same

The present invention also provides a three-dimensional shaped object constituted of a photocured product of the model material ink comprised in the above-described model material ink set. In an optical molding method by an inkjet system, the three-dimensional shaped object can be manufactured using the ink set of the present invention. The present invention also provides a method for manufacturing a three-dimensional shaped object, the method comprising manufacturing a three-dimensional shaped object by an optical molding method by an inkjet system with use of the ink set of the present invention. In the manufacturing method for the present invention, a three-dimensional molding system including at least a personal computer and a three-dimensional molding apparatus connected to the personal computer may be used.

The method for manufacturing a three-dimensional shaped object of the present invention is not particularly limited as long as it is a method for manufacturing a three-dimensional shaped object by an optical molding method by an inkjet system with use of the ink set of the present invention. In one preferred embodiment of the present invention, the manufacturing method of the present invention includes a step (I) of photocuring the model material ink comprised in the model material ink set to obtain a model material, and photocuring the support material composition to obtain a support material; and a step (II) of removing the support material from the model material. The step (I) and the step (II) are not particularly limited, but these may be performed, for example, by the following method.

<Step (I)>

FIG. 1 is a view schematically showing the step (I) in the method for manufacturing a three-dimensional shaped object according to one embodiment of the present invention. As shown in FIG. 1, a three-dimensional molding apparatus 1 includes an inkjet head module 2 and a molding table 3. The inkjet head module 2 has an inkjet head 21 for a model material filled with a model material ink 4a, an inkjet head 22 for a support material filled with a support material composition 5a, a roller 23, and a light source 24.

First, the inkjet head module 2 is made to perform scanning in an X direction and a Y direction relatively with respect to the molding table 3 in FIG. 1, and at the same time, the model material ink 4a is discharged from the inkjet head 21 for a model material, and the support material composition 5a is discharged from the inkjet head 22 for a support material, and thereby, a resin composition layer composed of the model material ink 4a and the support material composition 5a is formed. In order to smooth an upper surface of the resin composition layer, the roller 23 is used to remove the surplus model material ink and support material composition. Then, the resin composition comprising the model material ink 4a and the support material composition 5a is irradiated with light using the light source 24, so that a cured layer composed of the model material 4 and the support material 5 is formed on the molding table 3.

Then, the molding table 3 is lowered in a Z direction in FIG. 1 by the thickness of the cured layer. Thereafter, by the same method as that described above, a cured layer composed of the model material 4 and the support material 5 is further formed on the cured layer. These steps are repeatedly performed to fabricate a cured product 6 composed of the model material 4 and the support material 5.

Examples of the light that cures the model material ink and the support material composition include far infrared rays, infrared rays, visible rays, near ultraviolet rays, and ultraviolet rays. Among these, near ultraviolet rays or ultraviolet rays are preferable from the viewpoint of easiness and efficiency of curing work.

Examples of the light source 24 include a lamp system and an LED system. Among these, an LED system is preferable from the viewpoint of being capable of reducing the size of facility and requiring small power consumption.

<Step (II)>

Figure 2:
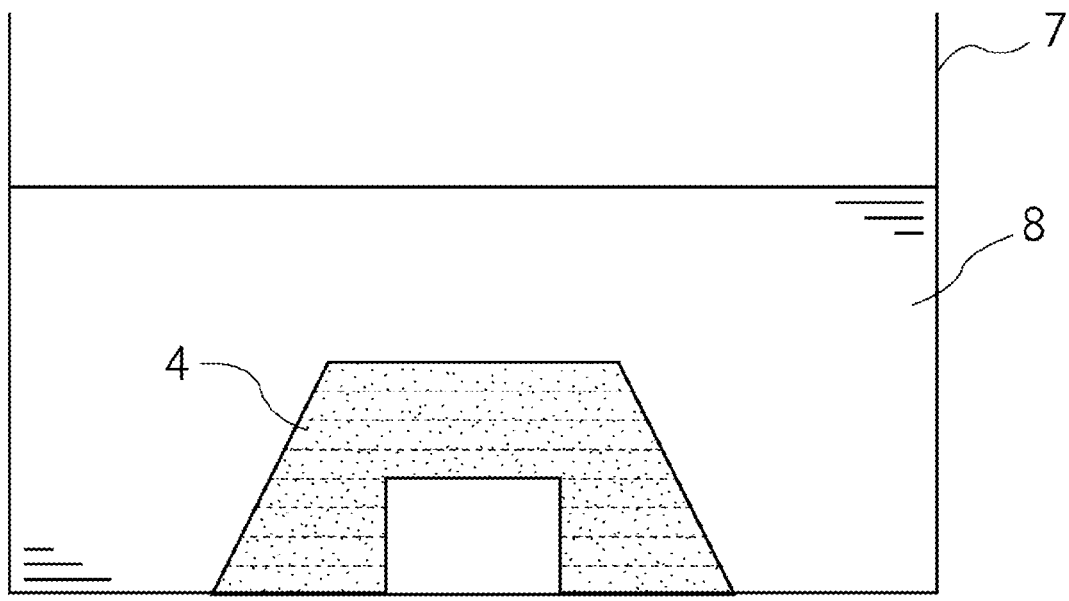
FIG. 2 is a view schematically showing a step (II) in one embodiment of the method for manufacturing a three-dimensional shaped object of the present invention.

FIG. 2 is a view schematically showing the step (II) in the method for manufacturing a three-dimensional shaped object according to one embodiment of the present invention. In the step (II), the cured product 6 fabricated in the step (I) and composed of the model material 4 and the support material 5 is immersed in a solvent 8 contained in a container 7. This makes it possible to dissolve the support material 5 in the solvent 8 to be removed as shown in FIG. 2.

Examples of the solvent 8 that dissolves the support material include ion-exchanged water, distilled water, tap water, and well water. Among these, ion-exchanged water is preferable from the viewpoint of containing impurities in a relatively small amount and being available at a low price.

By photocuring the model material ink through the steps described above, the three-dimensional shaped object of the present invention can be manufactured.

EXAMPLES

Hereinafter, the present invention will be described in more detail by way of Examples. The present invention is not limited to these Examples only.

Codes and details of the raw materials used in Examples and Comparative Examples described below are shown in the following Tables 1 to 5.

TABLE 1

| | | Coloring agent | |
|---|---|---|---|
| | Code | Component | Trade name, specification |
| Black | MA-8 | Acidic carbon black pigment | Mitsubishi Chemical Corporation, MA-8 |
| Yellow | 4G01 | Condensed azo pigment | Manufactured by Clariant, NOVOPERM YELLOW 4G01 (C.I. PY155) |
| | G01 | Azo nickel complex | Manufactured by LANXESS AG, LEVASCREEN YELLOW G01 (C.I. PY150) |
| Magenta | RT355D | Quinacridone pigment | Manufactured by Ciba, CINQUASIA Magenda RT-355-D (C.I. PR202 + C.I. PV19) |
| | 228-6483 | Quinacridone pigment | Manufactured by DIC corporation, Quind Magenta 202 228-6483 (C.I. PR202) |
| | RG | Quinacridone pigment | Manufactured by DIC corporation, Fastogen Super Magenta RG (C.I. PR122) |
| Cyan | B4G | Copper phthalocyanine pigment | Manufactured by Clariant, HOSTAPERM BLUE B4G (C.I. PB15:3) |
| | P-BFS | Copper phthalocyanine pigment | Manufactured by Clariant, HOSTAPERM BLUE P-BFS (C.I. PB15:4) |
| White | JR-806 | Titanium oxide (JR806) | Manufactured by TAYCA Corporation, JR806 (rutile type, alumina-silica surface modified) |
| Pigment dispersant | Sol. 32000 | Comb-shaped copolymer having basic functional group | Manufactured by Avecia, SOLSPERSE 32000 |

TABLE 2

| | | Ethylenically unsaturated monomer | |
|---|---|---|---|
| | Code | Component | Trade name, specification |
| Monofunctional nitrogen atom-containing ethylenically unsaturated monomer | HEAA | Hydroxyethylacrylamide | Manufactured by KJ Chemical Co., Ltd., hydroxyethylacrylamide (ethylenic double bond(s)/molecule: 1 bond) |
| | ACMO | Acryloylmorpholine | Manufactured by KJ Chemical Co., Ltd., acryloylmorpholine (ethylenic double bond(s)/molecule: 1 bond) |
| | NVC | N-Vinylcaprolactam | Manufactured by ASHLAND, V-Cap RC (ethylenic double bond(s)/molecule: 1 bond) |
| Monofunctional (meth)acrylate | IBOA | Isobornyl acrylate | Manufactured by Arkema S.A., SARTOMER SR506D (ethylenic double bond(s)/molecule: 1 bond) |
| | TMCHA | 3,5,5-Trimethylcyclohexanol acrylate | Manufactured by Arkema S.A., SARTOMER SR420 (ethylenic double bond(s)/molecule: 1 bond) |
| | PEA | Pheoxyethyl acrylate | Manufactured by Arkema S.A., SARTOMER SR339NS (ethylenic double bond(s)/molecule: 1 bond) |

TABLE 2-continued

Ethylenically unsaturated monomer

| | Code | Component | Trade name, specification |
|---|---|---|---|
| | Ebe110 | Ethoxylated (2 mol) phenyl acrylate | Manufactured by DAICEL-ALLNEX LTD., EBECRYL110 (ethylenic double bond(s)/molecule: 1 bond) |
| Polyfunctional (meth)acrylate | HDDA | Hexanediol acrylate | Manufactured by Arkema S.A., SARTOMER SR238(ethylenic double bond(s)/molecule: 2 bonds) |
| | TPGDA | Tripropylene glycol diacrylate | Manufactured by Arkema S.A., SARTOMER SR306 (ethylenic double bond(s)/molecule: 2 bonds) |
| | PE-3A | Pentaerythritol triacrylate | Manufactured by KYOEISHA CHEMICAL CO., LTD., LIGHT ACRYLATE PE-3A (ethylenic double bond(s)/molecule: 3 bonds) |
| | M-400 | Dipentaerythritol hexaacrylate | Manufactured by TOAGOSEI Co., LTD., ARONIX M-400 (ethylenic double bond(s)/molecule: 6 bonds) |

TABLE 3

Polyalkylene glycol adduct containing oxyethylene group or oxypropylene group

| Code | Component | Trade name, specification |
|---|---|---|
| PPG-400 | Polypropylene glycol | Manufactured by NOF Corporation, UNIOR TG400 (molecular weight: 400) |
| PPG-1000 | Polypropylene glycol | Manufactured by NOF Corporation, UNIOR TG1000 (molecular weight: 1000) |
| PEG-400 | Polyethylene glycol | Manufactured by NOF Corporation, PEG#400 (molecular weight: 400) |
| PEG-1000 | Polyethylene glycol | Manufactured by NOF Corporation, PEG#1000 (molecular weight: 1000) |

TABLE 4

Photopolymerization initiator

| | Code | Component | Trade name, specification |
|---|---|---|---|
| Acylphosphinoxide-based | DAROCURE TPO | 2,4,6-Trimethylbenzoyl-diphenyl-phosphine oxide | Manufactured by BASF SE, DAROCURE TPO |
| α-Aminoalkylphenones | IRGACURE 907 | 2-Methyl-1-[4-(methylthio)phenyl]-2-morpholinopropan-1-one | Manufactured by BASF SE, IRGACURE 907 |
| | IRGACURE 651 | 2,2-dimethoxy-1,2-diphenylethan-1-one | Manufactured by BASF SE, IRGACURE 651 |
| Thioxanthones | Chivacure ITX | Isopropylthioxanthone | Manufactured by Double Bond Chemical Co., Ltd., Chivacure ITX |

TABLE 5

| | Code | Component | Trade name, specification |
|---|---|---|---|
| Surface adjusting agent | TEGO-Rad2100 | Silicon acrylate having polydimethylsiloxane structure | Manufactured by Degussa AG, TEGO-Rad2100 |
| Preservation stabilizer | HYDROXY-TEMPO | 4-Hydroxy-2,2,6,6-tetramethylpiperidin-N-oxyl | Manufactured by Evonik Degussa Japan Co., Ltd., H-TEMPO |
| | MEHQ | Methoxyhydroquinone | Manufactured by Tokyo Chemical Industry Co., Ltd., 4-methoxyphenol |

The polymerizable oligomers A and B used in Examples and Comparative Examples described below were manufactured as follows.

Manufacturing Example 1

Manufacturing of Polymerizable Oligomer A

A reaction vessel equipped with a stirrer was charged with 1 mol (689 g) of caprolactone 5 mol adduct of 2-hydroxyethyl acrylate (Placcel FA-5D (manufactured by Daicel Corporation)), 0.5 mol (132 g) of dicyclohexylmethane diisocyanate (manufactured by Tokyo Chemical Industry Co., Ltd.) and 0.2 mmol (0.12 g) of dibutyltin dilaurate (manufactured by Tokyo Chemical Industry Co., Ltd.) as a urethanization catalyst, and a reaction was carried out under heat at 80° C. for 6 hours, and thus a urethane-based polymerizable oligomer A having a dicyclohexylmethane structure was obtained.

Manufacturing Example 2

Manufacturing of Polymerizable Oligomer B

A reaction vessel equipped with a stirrer was charged with 1 mol (689 g) of caprolactone 5 mol adduct of 2-hydroxyethyl acrylate (Placcel FA-5D (manufactured by Daicel Corporation)), 0.5 mol (111 g) of isophorone diisocyanate (manufactured by Tokyo Chemical Industry Co., Ltd.) and 0.2 mmol (0.12 g) of dibutyltin dilaurate (manufactured by Tokyo Chemical Industry Co., Ltd.) as a urethanization catalyst, and a reaction was carried out under heat at 80° C. for 6 hours, and thus a urethane-based polymerizable oligomer B having an isophorone structure was obtained.

<Model Material Ink>

(Manufacturing of Clear Ink)

The components shown in Table 6 with the blend amounts shown in the Table were uniformly mixed using a mixing and stirring device to manufacture clear inks of Examples 1 to 4 and Comparative Examples 1 and 2.

TABLE 6

| | | | Clear ink | | | | | |
| --- | --- | --- | --- | --- | --- | --- | --- | --- |
| | | | Example | | | | Comparative Example | |
| Component | | Code | 1 | 2 | 3 | 4 | 1 | 2 |
| Ethylenically unsaturated monomer | Monofunctional ethylenically unsaturated monomer | ACMO | — | — | — | — | 30 | — |
| | | NVC | — | — | — | — | — | 30 |
| | Monofunctional ethylenically unsaturated monomer | IBOA | 30 | 30 | — | 30 | 30 | 30 |
| | | TMCHA | — | — | 30 | — | — | — |
| | | PEA | 30 | — | 30 | 30 | — | — |
| | | Ebe110 | — | 30 | — | — | — | — |
| | Di- or more functional ethylenically unsaturated monomer | HDDA | 11.8 | — | — | 11.8 | 11.8 | 11.8 |
| | | TPGDA | — | 11.8 | — | — | — | — |
| | | PE-3A | — | — | 11.8 | — | — | — |
| Polymerizable oligomer component | | A | 25.0 | 25.0 | 25.0 | — | 25.0 | 25.0 |
| | | B | — | — | — | 25.0 | — | — |
| Photopolymerization initiator | Acylphosphinoxide-based | DAROCURE TPO | 3.0 | 3.0 | 3.0 | 3.0 | 3.0 | 3.0 |
| Surface adjusting agent | Silicone-based | TEGO-Rad2100 | 0.1 | 0.1 | 0.1 | 0.1 | 0.1 | 0.1 |
| Preservation stabilizer | | HYDROXY-TEMPO | 0.1 | 0.1 | 0.1 | 0.1 | 0.1 | 0.1 |
| Total | | | 100.0 | 100.0 | 100.0 | 100.0 | 100.0 | 100.0 |

(Manufacturing of Color Ink)

The components shown in Table 7 with the blend amounts shown in the Table were uniformly mixed using a mixing and stirring device to manufacture color inks of Examples 5 to 15 and Comparative Examples 3 to 7.

TABLE 7

| | | | Color ink Example | | | | | Color ink Comparative Example | | |
| --- | --- | --- | --- | --- | --- | --- | --- | --- | --- | --- |
| Component | | Code | 5 | 6 | 7 | 8 | 9 | 3 | 4 | 5 |
| Coloring agent | Black | MA-8 | 0.2 | — | — | — | — | 0.2 | — | — |
| | Yellow | Yellow 4G01 | — | 1.0 | — | — | — | — | 1.0 | — |
| | | G01 | — | — | — | — | — | — | — | — |
| | Magenta | RT355D | — | — | 1.0 | — | — | — | — | 1.0 |
| | | 228-6483 | — | — | — | — | — | — | — | — |
| | | RG | — | — | — | — | — | — | — | — |

TABLE 7-continued

| Component | | Code | | | | | | | | |
|---|---|---|---|---|---|---|---|---|---|---|
| | Cyan | B4G | — | — | — | 0.2 | — | — | — | — |
| | | P-BFS | — | — | — | — | — | — | — | — |
| | White | JR-806 | — | — | — | — | 3.0 | — | — | — |
| | Pigment dispersant | Sol. 32000 | 0.1 | 0.5 | 0.5 | 0.1 | 0.3 | 0.1 | 0.5 | 0.5 |
| Ethylenically unsaturated monomer | Monofunctional ethylenically unsaturated monomer | ACMO | 30 | 30 | 30 | 30 | 30 | — | — | — |
| | | NVC | — | — | — | — | — | — | — | — |
| | Monofunctional ethylenically unsaturated monomer | IBOA | 30 | 30 | 30 | 30 | 30 | 30 | 30 | 30 |
| | | TMCHA | — | — | — | — | — | 30 | 30 | 30 |
| | Di⁻ or more functional ethylenically unsaturated monomer | HDDA | — | — | — | — | — | 16.5 | 15.3 | 15.3 |
| | | TPGDA | 16.5 | 15.3 | 15.3 | 16.5 | 13.5 | — | — | — |
| | Polymerizable oligomer component | A | — | — | — | — | — | — | — | — |
| | | B | 20 | 20 | 20 | 20 | 20 | 20 | 20 | 20 |
| Photopolymerization initiator | Acylphosphinoxide-based | DAROCURE TPO | 3 | 3 | 3 | 3 | 3 | 3 | 3 | 3 |
| Surface adjusting agent | Silicone-based | TEGO-Rad2100 | 0.1 | 0.1 | 0.1 | 0.1 | 0.1 | 0.1 | 0.1 | 0.1 |
| | Preservation stabilizer | HYDROXY-TEMPO | 0.1 | 0.1 | 0.1 | 0.1 | 0.1 | 0.1 | 0.1 | 0.1 |
| | Total | | 100.0 | 100.0 | 100.0 | 100.0 | 100.0 | 100.0 | 100.0 | 100.0 |
| | Color | | K | Y | M | C | W | K | Y | M |

| Component | | Code | Color ink Comparative Example | | Color ink Example | | | | | |
|---|---|---|---|---|---|---|---|---|---|---|
| | | | 6 | 7 | 10 | 11 | 12 | 13 | 14 | 15 |
| Coloring agent | Black | MA-8 | — | — | 0.2 | — | — | — | — | — |
| | Yellow | Yellow 4G01 | — | — | — | — | — | — | — | — |
| | | G01 | — | — | — | 1.0 | — | — | — | — |
| | Magenta | RT355D | — | — | — | — | — | — | — | — |
| | | 228-6483 | — | — | — | — | 1.0 | — | — | — |
| | | RG | — | — | — | — | — | 1.0 | — | — |
| | Cyan | B4G | 0.2 | — | — | — | — | — | — | — |
| | | P-BFS | — | — | — | — | — | — | 0.2 | — |
| | White | JR-806 | — | 3.0 | — | — | — | — | — | 3.0 |
| | Pigment dispersant | Sol. 32000 | 0.1 | 0.3 | 0.1 | 0.5 | 0.5 | 0.5 | 0.1 | 0.3 |
| Ethylenically unsaturated monomer | Monofunctional ethylenically unsaturated monomer | ACMO | — | — | 30 | 30 | 30 | 30 | 30 | — |
| | | NVC | — | — | — | — | — | — | — | 30 |
| | Monofunctional ethylenically unsaturated monomer | IBOA | 30 | 30 | 30 | 30 | 30 | 30 | 30 | 30 |
| | | TMCHA | 30 | 30 | — | — | — | — | — | — |
| | Di⁻ or more functional ethylenically unsaturated monomer | HDDA | 16.5 | 13.5 | 16.5 | 15.3 | 15.3 | 15.3 | 16.5 | 13.5 |
| | | TPGDA | — | — | — | — | — | — | — | — |
| | Polymerizable oligomer component | A | — | — | 20 | — | — | — | — | — |
| | | B | 20 | 20 | — | 20 | 20 | 20 | 20 | 20 |
| Photopolymerization initiator | Acylphosphinoxide-based | DAROCURE TPO | 3 | 3 | 3 | 3 | 3 | 3 | 3 | 3 |
| Surface adjusting agent | Silicone-based | TEGO-Rad2100 | 0.1 | 0.1 | 0.1 | 0.1 | 0.1 | 0.1 | 0.1 | 0.1 |
| | Preservation stabilizer | HYDROXY-TEMPO | 0.1 | 0.1 | 0.1 | 0.1 | 0.1 | 0.1 | 0.1 | 0.1 |
| | Total | | 100.0 | 100.0 | 100.0 | 100.0 | 100.0 | 100.0 | 100.0 | 100.0 |
| | Color | | C | W | K | Y | M | M | C | W |

For the color inks and clear inks manufactured in the above Examples and Comparative Examples, the following physical property values were measured in accordance with the methods described below. The results are shown in Tables 8 and 9.

<Measurement of Tensile Strength>

Each of the inks of Examples and Comparative Examples, which was molded in accordance with the multipurpose specimen type A1 shape specified in JIS K 7139-2009 "Plastics—Test specimens" using a molding apparatus in a ultraviolet ray-curing type inkjet system, was used as a sample to be measured, and a tensile strength was measured in accordance with JIS K 7162:1994 "Plastics—Determination of tensile properties—Part 2: Test conditions for molding and extrusion plastics." (molding conditions: lamination thickness per layer: 32 μm, Illuminance: 1000 mW/cm², integrated light quantity per layer: 800 mJ/cm²).

<Measurement of Flexural Strength>

A sample molded in accordance with a strip-shaped specimen shape B2 specified in JIS K 7139:2009 "Plastics—Test specimens" with the same molding apparatus and under the same conditions as in the measurement of tensile strength was used as a sample to be measured, and a flexural strength was measured in accordance with JIS K 7171:2008 "Plastics—Determination of flexural properties".

<Measurement of Charpy Impact Strength>

A sample prepared in the same manner as in the measurement of flexural strength was used as a sample to be measured, and the Charpy impact strength was measured in accordance with JIS K 7111:-1: 2012 "Plastics—Determination of Charpy impact properties—Part 1: Non-instrumented impact test".

<Measurement of Shore D Hardness>

Two samples prepared in the same manner as in the measurement of flexural strength were superposed in two layers to obtain a sample to be measured, and the Shore D hardness was measured in accordance with JIS K 7215:1986 "Testing Methods for Durometer Hardness of Plastics".

<Measurement of Lab Color Difference>

(Color Difference 1) Measurement with 2 mm Plate

Each of the inks of Examples and Comparative Examples was molded into a plate with 2 mm in thickness using a molding apparatus in an ultraviolet ray-curing type inkjet system, and the plate was used as a sample to be measured (molding conditions: lamination thickness per layer: 32 μm, Illuminance: 1000 mW/cm², integrated light quantity per layer: 800 mJ/cm²). The Lab color difference of this sample was measured using a color difference meter "X-Rite 939" (manufactured by X-Rite).

(Color Difference 2) Measurement with Coating Film

Each of the inks of Examples and Comparative Examples was applied to white PET (U292W, manufactured by Teijin Ltd.) with a #14 bar coater, and then was cured by applying ultraviolet rays up to a total exposure of 500 mJ/c² using an ultraviolet LED (NCCU001E, manufactured by Nichia Corporation) as an irradiation means, and thus a sample to be measured was prepared. The Lab color difference of this sample was measured using a color difference meter "X-Rite 939" (manufactured by X-Rite).

TABLE 8

| | | Clear ink | | | | | |
|---|---|---|---|---|---|---|---|
| | | Example | | | | Comparative Example | |
| | | 1 | 2 | 3 | 4 | 1 | 2 |
| Tensile strength [MPa] | | 20 | 17 | 18 | 20 | 60 | 52 |
| Flexural strength [MPa] | | 5.5 | 4.8 | 4.4 | 5.2 | 95 | 82 |
| Charpy impact strength [KJ/m²] | | 4.5 | 5 | 5.5 | 4 | 1.2 | 1.8 |
| Shore D hardness | | 75 | 65 | 65 | 70 | 85 | 80 |
| Color difference (1) | L* | 85 | 82 | 85 | 80.4 | 75 | 73.6 |
| | a* | −1.5 | 1.2 | 0.6 | 1.5 | 7.8 | 4.1 |
| | b* | 9.7 | 8.6 | 8.1 | 13.8 | 37.5 | 41.1 |
| Color difference (2) | L* | 95.2 | 96.1 | 95.7 | 94.8 | 90.1 | 91.4 |
| | a* | −0.2 | 0.13 | 0.11 | 0.42 | 0.23 | 0.18 |
| | b* | −4.2 | −2.4 | 0.28 | 0.06 | 5.1 | 4.9 |

TABLE 9

| | | Clear ink | | | | | | | | | | | | | | |
|---|---|---|---|---|---|---|---|---|---|---|---|---|---|---|---|---|
| | | Example | | | | | Comparative Example | | | | | Example | | | | |
| | | 5 | 6 | 7 | 8 | 9 | 3 | 4 | 5 | 6 | 7 | 10 | 11 | 12 | 13 | 14 | 15 |
| Tensile strength [MPa] | | 53 | 51 | 57 | 55 | 62 | 20 | 18 | 21 | 20 | 25 | 45 | 50 | 55 | 55 | 57 | 60 |
| Flexural strength [MPa] | | 87 | 88 | 93 | 90 | 95 | 5.5 | 5.5 | 5.7 | 4.8 | 6 | 72 | 85 | 90 | 85 | 86 | 93.4 |
| Charpy impact strength [KJ/m²] | | 1.2 | 1.6 | 1.3 | 1.4 | 1.5 | 4.5 | 4 | 4.8 | 4.5 | 4.8 | 1.2 | 1.5 | 1.2 | 1.6 | 1.5 | 1.3 |
| Shore D hardness | | 85 | 80 | 85 | 85 | 90 | 75 | 70 | 70 | 70 | 70 | 80 | 80 | 85 | 85 | 85 | 90 |
| Color difference (1) | L* | 4.2 | 72.3 | 14.8 | 5.5 | 93.1 | 3.1 | 71.6 | 14.1 | 5.5 | 91.1 | 4.5 | 72.6 | 15.6 | 15 | 6.2 | 92.6 |
| | a* | 0.2 | 1 | 40.1 | 16.2 | 1.5 | 0.3 | 1.2 | 39.9 | 15.8 | 1.2 | 0.5 | 0.4 | 39.2 | 36.8 | 13.2 | 2.0 |
| | b* | −0.8 | 95.5 | 14.2 | −30.4 | 7.2 | 0.2 | 93.6 | 14.6 | −30.9 | 5.4 | −0.3 | 97.5 | 16.4 | 13.5 | −28.6 | 5.1 |
| Color difference (2) | L* | 26.7 | 90.6 | 55.9 | 65.2 | 95.7 | 24.3 | 90.1 | 56.8 | 65 | 94.7 | 25.1 | 87.2 | 53.1 | 52.9 | 63.7 | 93.1 |
| | a* | 2.62 | −8.6 | 60.9 | −36.7 | −1.8 | 2.53 | −8.2 | 60.1 | −36.9 | −1.1 | 2.48 | 0.21 | 58.4 | 56.4 | −38.4 | 1.2 |
| | b* | 10.6 | 91.3 | −28.7 | −40.9 | −0.99 | 9.8 | 90.9 | −29.4 | −40.1 | 0.11 | 10.2 | 89.1 | −27.6 | −27.6 | −38.5 | 0.51 |

From the results of Tables 8 and 9 above, the cured products of the color inks comprised in the model material ink sets of the present invention were confirmed to have high tensile strength, flexural strength and Shore D hardness, and the strength and hardness of the cured products of the color inks were confirmed to be very high. The cured products of the clear inks comprised in the model material ink sets of the present invention were confirmed to be high in L value (brightness), superior in clearness, low in b value, suppressed in yellowish color tone, and to have strength and hardness at a certain level or higher. It was confirmed that such a combination of the clear ink and the color ink could sufficiently enhance the strength and hardness of the molded object and prevent the color change of the molded object. The strength and hardness of the color inks of the Comparative Examples were at equal to or more than a certain level; however, they were not sufficient to enhance the strength and hardness of the molded object. It was confirmed that the clear inks of the Comparative Examples were high in clearness and low in yellowish color tone before photocuring, but the cured products after photocuring were low in L value and high in yellowish color tone.

<Support Material Composition>
(Manufacturing of Support Material Composition)

The components shown in Table 10 with the blend amounts shown in the Table were uniformly mixed using a mixing and stirring device to manufacture support material compositions of Examples 16 to 38.

The details of the raw materials used for the support material compositions shown in Table 10 are shown below.

HEAA: N-Hydroxyethylacrylamide [HEAA (ethylenic double bond(s)/molecule: 1 bond), manufactured by KJ Chemical Co., Ltd.]

ACMO: Acryloylmorpholine [ACMO (ethylenic double bond(s)/molecule: 1 bond), manufactured by KJ Chemical Co., Ltd.]

DMAA: N,N'-dimethylacrylamide [DMAA (ethylenic double bond(s)/molecule: 1 bond, manufactured by KJ Chemical Co., Ltd.]

PPG-400: Polypropylene glycol [UNIOL TG400 (molecular weight: 400), manufactured by NOF Corporation]

PPG-1000: Polypropylene glycol [UNIOL TG1000 (molecular weight: 1000), manufactured by NOF Corporation]

PEG-400: Polyethylene glycol [PEG #400 (molecular weight 400), manufactured by NOF Corporation]

TABLE 10

Support material composition

| Component | Code | Example | | | | | | | | | | | |
|---|---|---|---|---|---|---|---|---|---|---|---|---|---|
| | | 16 | 17 | 18 | 19 | 20 | 21 | 22 | 23 | 24 | 25 | 26 | 27 |
| Ethylenically unsaturated monomer | HEAA | 25 | 25 | 25 | 25 | 25 | — | — | — | — | — | — | — |
| | ACMO | — | — | — | — | — | 25 | — | 20 | 50 | 41.6 | 30 | 40 |
| | DMAA | — | — | — | — | — | — | 25 | — | — | — | — | — |
| Organic solvent | MTG | 21.6 | 21.6 | 21.6 | 21.6 | — | 21.6 | 21.6 | 26.6 | 11.6 | 5 | 35 | 31.6 |
| | DPMA | — | — | — | — | 21.6 | — | — | — | — | — | — | — |
| Polyalkylene glycol containing oxyethylene group or oxypropylene group | PPG-400 | 45 | — | — | — | — | — | — | — | — | — | — | — |
| | PPG-1000 | — | 45 | — | — | 45 | 45 | 45 | 45 | 30 | 45 | 26.6 | 20 |
| | PEG-400 | — | — | 45 | — | — | — | — | — | — | — | — | — |
| | PEG-1000 | — | — | — | 45 | — | — | — | — | — | — | — | — |
| Photopolymerization initiator | DAROCURE TPO | 8 | 8 | 8 | 8 | 8 | 8 | 8 | 8 | 8 | 8 | 8 | 8 |
| Surface adjusting agent | TEGO-Rad2100 | 0 1 | 0.1 | 0.1 | 0.1 | 0.1 | 0.1 | 0.1 | 0.1 | 0.1 | 0.1 | 0.1 | 0.1 |
| Preservation stabilizer | IRGAUTAB UV-10 | 0.3 | 0.3 | 0.3 | 0.3 | 0.3 | 0.3 | 0.3 | 0.3 | 0.3 | 0.3 | 0.3 | 0.3 |
| Total | | 100 | 100 | 100 | 100 | 100 | 100 | 100 | 100 | 100 | 100 | 100 | 100 |

| Component | Code | Example | | | | | | | | | | |
|---|---|---|---|---|---|---|---|---|---|---|---|---|
| | | 28 | 29 | 30 | 31 | 32 | 33 | 34 | 35 | 36 | 37 | 38 |
| Ethylenically unsaturated monomer | HEAA | — | — | — | — | — | — | — | — | — | — | — |
| | ACMO | 21 | 25 | 25 | 15 | 55 | 40 | 25 | 40 | 20 | 25 | 25 |
| | DMAA | — | — | — | — | — | — | — | — | — | — | — |
| Organic solvent | MTG | 21.6 | 24.6 | 21.6 | 31.6 | 11.6 | 0 | 40 | 36.6 | 16.6 | 26.6 | 14.6 |
| | DPMA | — | — | — | — | — | — | — | — | — | — | — |
| Polyalkylene glycol containing oxyethylene group or oxypropylene group | PPG-400 | — | — | — | — | — | — | — | — | — | — | — |
| | PPG-1000 | 49 | 45 | 33 | 45 | 25 | 51.6 | 26.6 | 15 | 55 | 45 | 35 |
| | PEG-400 | — | — | — | — | — | — | — | — | — | — | — |
| | PEG-1000 | — | — | — | — | — | — | — | — | — | — | — |
| Photopolymerization initiator | DAROCURE TPO | 8 | 5 | 20 | 8 | 8 | 8 | 8 | 8 | 8 | 3 | 25 |
| Surface adjusting agent | TEGO-Rad2100 | 0.1 | 0.1 | 0.1 | 0.1 | 0.1 | 0.1 | 0.1 | 0.1 | 0.1 | 0.1 | 0.1 |
| Preservation stabilizer | IRGAUTAB UV-10 | 0.3 | 0.3 | 0.3 | 0.3 | 0.3 | 0.3 | 0.3 | 0.3 | 0.3 | 0.3 | 0.3 |
| Total | | 100 | 100 | 100 | 100 | 100 | 100 | 100 | 100 | 100 | 100 | 100 |

PEG-1000: Polyethylene glycol [PEG #1000 (molecular weight 1000), manufactured by NOF Corporation]

MTG: Triethylene glycol monomethyl ether [MTG, manufactured by Nippon Nyukazai Co., Ltd.]

DPMA: Dipropylene glycol monomethyl ether acetate [DOWANOL DPMA, manufactured by The Dow Chemical Company]

(Measurement of Viscosity)

The viscosity of each support material composition was measured using an R100 viscometer (manufactured by Toki Sangyo Co., Ltd.) under the conditions of 25° C. and a cone rotation number of 5 rpm, and was evaluated based on the following criteria. The results are shown in Table 11.

A: Viscosity≤70 mPa·s
B: Viscosity>70 mPa·s (Solubility in Water)

In an aluminum cup having a diameter of 50 mm, 2.0 g of each support material composition was taken. Subsequently, the support material composition was cured by applying ultraviolet rays up to a total exposure of 500 mJ/cm² using an ultraviolet LED (NCCU001E, manufactured by Nichia Corporation) as an irradiation means, and thus a support material was obtained. Thereafter, the support material was released from the aluminum cup. Then, the support material was immersed in 500 ml of ion-exchanged water put in a beaker. The support material was visually observed every 10 minutes, and the time required from the start of the immersion to the complete dissolution or disappearance of the original shape of the support material (hereinafter, referred to as water dissolution time) was measured, and the solubility was evaluated based on the following criteria. The results are shown in Table 10.

A: Water dissolution time≤1 hour
B: 1 Hour<water dissolution time<1.5 hours
C: Water dissolution time≥1.5 hours (Evaluation of Oily Effusion)

On an aluminum foil having 100 mm×100 mm in size, 1.0 g of each support material composition was taken.

Subsequently, the support material composition was cured by applying ultraviolet rays up to a total exposure of 500 mJ/cm² using an ultraviolet LED (NCCU001E, manufactured by Nichia Corporation) as an irradiation means, and thus a support material was obtained. At this point, the support material was in a solid state. The support material was left to stand for 2 hours, and the presence or absence of oily effusion on the surface of the support material was visually observed and evaluated according to the following criteria. The results are shown in Table 10.

A: No oily effusion was observed at all.
B: Slight oily effusion was observed.
C: Much oily effusion was observed.

(Evaluation of Self-Standing)

Spacers each with a thickness of 1 mm were disposed on the four sides of the upper surface of a glass plate (trade name "GLASS PLATE", manufactured by AS ONE Corporation, 200 mm×200 mm×5 mm thickness) to divide it into squares each having 10 cm×10 cm in size. Each support material composition was cast into the squares, and then, another sheet of the above-mentioned glass plate was put thereon. Then, the support material composition was cured by applying ultraviolet rays up to a total exposure of 500 mJ/cm² using an ultraviolet LED (NCCU001E, manufactured by Nichia Corporation) as an irradiation means, and thus a support material was obtained. Thereafter, the support material was released from the glass plate, and cut into a shape of 10 mm long and 10 mm wide with a cutter to obtain a specimen. Next, 10 pieces of the specimen were stacked to obtain a specimen group having a height of 10 mm. The specimen group with a 100 g weight put thereon was placed in an oven set at 30° C. and was left to stand for 1 hour. Thereafter, the shape of the specimens was observed, and the self-standing was evaluated according to the following criteria. The results are shown in Table 10.

A: There was no change in shape.
B: The shape changed slightly and the weight inclined.
C: The shape changed significantly

TABLE 11

| Support material composition | Example | | | | | | | | | | | | | | | | | | | | | | |
|---|---|---|---|---|---|---|---|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 |
| Viscosity [mPa · s] | A | A | A | A | A | A | A | A | A | A | A | A | A | A | A | A | A | C | A | A | C | A | — |
| Solubility in water | A | A | A | A | A | A | A | A | B | A | A | B | A | A | A | A | C | A | A | C | A | A | — |
| Oily effusion | A | A | A | A | A | A | A | A | A | B | A | B | A | A | A | A | B | C | C | C | A | — | — |
| Self-standing | A | A | A | A | A | A | A | B | A | A | A | B | A | A | C | A | A | A | A | A | C | — | — |

From the results in Table 11, it can be seen that the support material composition that is a preferred embodiment of the present invention and that contains the respective components in the prescribed amounts exhibits a viscosity suitable for being discharged from an inkjet head. Moreover, the support material obtained by photocuring the support material composition of this embodiment had high solubility in water, was suppressed in oily effusion, and exhibited sufficient self-standing.

<Optically Molded Object>

(Evaluation of Adhesion)

Spacers each with a thickness of 1 mm were disposed on the four sides of the upper surface of a glass plate (trade name "GLASS PLATE", manufactured by AS ONE Corporation, 200 mm×200 mm×5 mm thickness) to divide it into squares each having 10 cm×10 cm in size. After casting the support material composition obtained in Example 25 into the squares, it was cured by applying ultraviolet rays up to a total exposure of 500 mJ/cm² using an ultraviolet LED (NCCU001E, manufactured by Nichia Corporation) as an irradiation means, and thus a support material was obtained.

Next, five support materials were fabricated as described above, and spacers each with a thickness of 1 mm were placed on the four sides of the upper surface of each support material to divide it into squares each having 10 cm×10 cm in size. After casting the model material inks of Examples 5 to 9 into each of the squares, they were cured by applying ultraviolet rays up to a total exposure of 500 mJ/cm² using an ultraviolet LED (NCCU001E, manufactured by Nichia Corporation) as an irradiation means, and thus a model material was obtained.

In this state, the model material and the support material were left in a thermostatic chamber at 30° C. for 12 hours, and the state of the adhesion between the model material and the support material was visually examined, and the adhesion was evaluated according to the following criteria. The results are shown in Table 12.

A: The model material and the support material were in adhesion with each other.
B: The model material and the support material were in adhesion with each other, but peeling occurred when the interface between the model material and the support material was scratched with a nail.
C: Peeling occurred at the interface between the model material and the support material, and the model material warped and peeled off due to the cure shrinkage of the model material.

TABLE 12

|  | Example | | | | |
|---|---|---|---|---|---|
|  | 5 | 6 | 7 | 8 | 9 |
| Model material ink | 5 | 6 | 7 | 8 | 9 |
| Support material composition | 25 | 25 | 25 | 25 | 25 |
| Adhesion | A | A | A | A | A |

As can be seen from the results in Table 12, the model material inks (color inks) and the support material compositions of the present invention exhibited good adhesion. As described above, if the model material and the support material are in adhesion with each other, an optically molded object with good dimensional accuracy can be obtained.

DESCRIPTION OF REFERENCE SIGNS

1: Three-dimensional molding apparatus
2: Inkjet head module
3: Molding table
4: Model material
4a: Model material ink
5: Support material
6: Cured product
7: Container
8: Solvent
5a: Support material composition
21: Inkjet head for model material
22: Inkjet head for support material
23: Roller
24: Light source

The invention claimed is:

1. A model material ink set for use in an optical molding method by an inkjet system, the ink set comprising a color ink and a clear ink as a model material ink,
wherein:
the color ink and the clear ink each contain one or more ethylenically unsaturated monomers,
the color ink contains, as the one or more ethylenically unsaturated monomers, 30 to 75% by mass of a (meth) acrylate and 20 to 50% by mass of an ethylenically unsaturated monomer that is not a (meth)acrylate and that contains a nitrogen atom, based on a total amount of the color ink,
the clear ink contains, as one or more ethylenically unsaturated monomers, 30 to 80% by mass of a (meth) acrylate based on a total amount of the clear ink, provided that a content of the ethylenically unsaturated monomer that is not a (meth)acrylate and that contains a nitrogen atom in the clear ink is less than 10% by mass based on the total amount of the clear ink, and
the (meth)acrylate contained in the clear ink comprises a (meth) acrylate having an aromatic hydrocarbon group, and the(meth) acrylate having an aromatic hydrocarbon group is phenoxyethyl (meth)acrylate and/or ethoxylated phenyl (meth)acrylate.

2. The model material ink set according to claim 1, wherein the ethylenically unsaturated monomer that is not a (meth)acrylate and that contains a nitrogen atom is selected from the group consisting of (meth)acrylamides and N-vinyllactams.

3. The model material ink set according to claim 1, wherein the color ink and the clear ink each contain, as the one or more ethylenically unsaturated monomers, a monofunctional ethylenically unsaturated monomer and a di- or more functional ethylenically unsaturated monomer.

4. The model material ink set according to claim 3, wherein a content of the monofunctional ethylenically unsaturated monomer in the color ink is 30 to 70% by mass based on the total amount of the color ink.

5. The model material ink set according to claim 3, wherein a content of the di- or more functional ethylenically unsaturated monomer in the color ink is 5 to 50% by mass based on the total amount of the color ink.

6. The model material ink set according to claim 3, wherein a content of the monofunctional ethylenically unsaturated monomer in the clear ink is 20 to 70% by mass based on the total amount of the clear ink.

7. The model material ink set according to claim 3, wherein a content of the di- or more functional ethylenically unsaturated monomer in the clear ink is 5 to 50% by mass based on the total amount of the clear ink.

8. The model material ink set according to claim 1, wherein the color ink contains, as the ethylenically unsaturated monomer that is not a (meth)acrylate and that contains a nitrogen atom, acryloylmorpholine and/or hydroxyethylacrylamide.

9. The model material ink set according to claim 1, wherein the color ink and the clear ink each further contain a polymerizable oligomer.

10. The model material ink set according to claim 9, wherein the polymerizable oligomer has a urethane group.

11. The model material ink set according to claim 9, wherein a content of the polymerizable oligomer in each of the color ink and the clear ink is 10 to 45% by mass based on a total amount of each of the color ink and the clear ink.

12. The model material ink set according to claim 1, wherein the color ink and the clear ink each further contain 2 to 15% by mass of a photopolymerization initiator based on the total amount of each of the color ink and the clear ink.

13. The model material ink set according to claim 1, wherein the color ink and the clear ink further contain a surface adjusting agent.

14. The model material ink set according to claim 1, wherein the color ink comprises one or more of a cyan ink, a magenta ink, and a yellow ink.

15. The model material ink set according to claim 14, wherein the color ink further comprises one or more of a white ink and a black ink.

16. The model material ink set according to claim 14, wherein
the cyan ink contains at least one pigment selected from the group consisting of C.I. Pigment Blue 15:3 and C.I. Pigment Blue 15:4,
the magenta ink contains at least one pigment selected from the group consisting of C.I. Pigment Red 122, C.I. Pigment Red 202 and C.I. Pigment Violet 19,
the yellow ink contains at least one pigment selected from the group consisting of C.I. Pigment Yellow 150 and C.I. Pigment Yellow 155.

17. The model material ink set according to claim 15, wherein the white ink contains titanium oxide which is rutile type titanium oxide.

18. An ink set for optical molding by an inkjet system, the ink set comprising the model material ink set according to claim 1 and a support material composition comprising a monofunctional ethylenically unsaturated monomers and a polyalkylene glycol having an oxyethylene group and/or an oxypropylene group.

19. A three-dimensional shaped object formed of a photocured product of the color ink and the clear ink comprised in the model material ink set according to claim 1.

20. A method for manufacturing a three-dimensional shaped object, the method comprising manufacturing a three-dimensional shaped object by an optical molding method by an inkjet system with use of the ink set according to claim 18.

21. The method according to claim 20, wherein a three-dimensional molding system including at least a personal computer and a three-dimensional molding apparatus connected to the personal computer is used.

22. An ink set according to claim 18, wherein the support material composition comprises 20 to 50% by mass of the monofunctional ethylenically unsaturated monomers, and 20 to 50% by mass of the polyalkylene glycol having an oxyethylene group and/or an oxypropylene group, based on a total amount of the support material composition.

23. An ink set according to claim 18, wherein the support material composition further comprises 2 to 20% by mass of a photopolymerization initiator based on the total amount of the support material composition.

24. An ink set according to claim 18, wherein the support material composition further comprising 3 to 35% by mass of a water-soluble organic solvent based on the total amount of the support material composition.

25. The model material ink set according to claim 1, wherein the color ink contains, as the one or more ethylenically unsaturated monomers, 25 to 50% by mass of the ethylenically unsaturated monomer that is not a (meth) acrylate and that contains a nitrogen atom, based on the total amount of the color ink.

26. The model material ink set according to claim 1, wherein the color ink contains, as the one or more ethylenically unsaturated monomers, 30 to 50% by mass of the ethylenically unsaturated monomer that is not a (meth) acrylate and that contains a nitrogen atom, based on the total amount of the color ink.

* * * * *